United States Patent
Pleva et al.

(10) Patent No.: US 6,642,908 B2
(45) Date of Patent: Nov. 4, 2003

(54) SWITCHED BEAM ANTENNA ARCHITECTURE

(75) Inventors: Joseph S. Pleva, Londonderry, NH (US); Caroline Breglia, Methuen, MA (US); Thomas W. French, Acton, MA (US); Walter Gordon Woodington, Lincoln, MA (US); Michael Joseph Delcheccolo, Westford, MA (US); Mark E. Russell, Westford, MA (US); H. Barteld Van Rees, Needham, MA (US)

(73) Assignee: Raytheon Company, Lexington, MA (US)

( * ) Notice: Subject to any disclaimer, the term of this patent is extended or adjusted under 35 U.S.C. 154(b) by 28 days.

(21) Appl. No.: 09/932,574

(22) Filed: Aug. 16, 2001

(65) Prior Publication Data

US 2002/0163478 A1 Nov. 7, 2002

Related U.S. Application Data

(60) Provisional application No. 60/226,160, filed on Aug. 16, 2000.

(51) Int. Cl.[7] .................................................. H01Q 3/24
(52) U.S. Cl. ............................... 343/876; 343/700 MS; 343/853
(58) Field of Search ......................... 343/700 MS, 853, 343/876; H01Q 3/24

(56) References Cited

U.S. PATENT DOCUMENTS

| | | | |
|---|---|---|---|
| 3,697,985 A | 10/1972 | Faris et al. | |
| 3,935,559 A | 1/1976 | Straffon et al. | |
| 3,940,696 A | 2/1976 | Nagy | |
| 3,974,501 A | 8/1976 | Ritzie | |
| 3,978,481 A | 8/1976 | Angwin et al. | |
| 4,003,049 A | 1/1977 | Sterzer et al. | |
| 4,008,473 A | 2/1977 | Hinachi et al. | |
| 4,008,475 A | 2/1977 | Johnson | |
| 4,035,797 A | 7/1977 | Nagy | |
| 4,063,243 A | 12/1977 | Anderson et al. | |
| 4,079,377 A | 3/1978 | zur Heiden et al. | |
| 4,143,370 A | 3/1979 | Yamanaka et al. | |
| 4,209,791 A | 6/1980 | Gerst et al. | |

(List continued on next page.)

FOREIGN PATENT DOCUMENTS

| | | |
|---|---|---|
| DE | 196 32 889 | 2/1998 |
| DE | 195 23 693 | 5/1998 |
| DE | 198 55 400 | 12/1998 |

(List continued on next page.)

OTHER PUBLICATIONS

Barnett, Roy I. et al. "A Feasibility Study of Stripline–Fed Slots Arranged as a Planar Array with Circular Grid and Circular Boundary", IEEE, 1989, pp. 1510–1515.

Bhattacharyya, Arum, et al. "Analysis of Srripline–Fed Slot––Coupled Patch Antennas with Vias for Parallel–Plate Mode Suppression", IEEE Transctions on Antennas and Propagation, vol. 46, No. 4, Apr. 1998, pp. 538–545.

Clouston E.N. et al. "A Triplate Stripline Slot Antenna Developed for Time–Domail Measurements on Phased Arrays", 1998, pp. 312–315.

(List continued on next page.)

*Primary Examiner*—Hoanganh Le
(74) *Attorney, Agent, or Firm*—Daly, Crowley & Mofford, LLP

(57) ABSTRACT

A multiple beam array antenna system comprises a plurality of radiating elements provided from stripline-fed open-ended waveguide coupled to a Butler matrix beam forming network. The Butler matrix beam forming network is coupled to a switched beam combining circuit. The antenna can be fabricated as a single Low Temperature Co-fired Ceramic (LTCC) circuit.

18 Claims, 13 Drawing Sheets

U.S. PATENT DOCUMENTS

| | | |
|---|---|---|
| 4,217,582 A | 8/1980 | Endo et al. |
| 4,246,585 A | 1/1981 | Mailloux |
| 4,308,536 A | 12/1981 | Sims, Jr. et al. |
| 4,348,675 A | 9/1982 | Senzaki et al. |
| 4,349,823 A | 9/1982 | Tagami et al. |
| 4,409,899 A | 10/1983 | Owen et al. |
| 4,414,550 A | 11/1983 | Tresselt |
| 4,507,662 A | 3/1985 | Rothenberg et al. |
| 4,543,577 A | 9/1985 | Tachibana et al. |
| 4,549,181 A | 10/1985 | Tachibana et al. |
| 4,622,636 A | 11/1986 | Tachibana |
| 4,673,937 A | 6/1987 | Davis |
| 4,703,429 A | 10/1987 | Sakata |
| 4,718,558 A | 1/1988 | Castaneda |
| 4,901,083 A | 2/1990 | May et al. |
| 4,962,383 A | 10/1990 | Tresselt |
| 4,965,605 A * | 10/1990 | Chang et al. .......... 343/700 MS |
| 4,970,653 A | 11/1990 | Kenue |
| 4,994,809 A | 2/1991 | Yung et al. |
| 5,008,678 A | 4/1991 | Herman |
| 5,014,200 A | 5/1991 | Chundrlik et al. |
| 5,023,617 A | 6/1991 | Deering |
| 5,045,856 A | 9/1991 | Paoletti |
| 5,115,245 A | 5/1992 | Wen et al. |
| 5,134,411 A | 7/1992 | Adler |
| 5,138,321 A | 8/1992 | Hammer |
| 5,173,859 A | 12/1992 | Deering |
| 5,189,426 A | 2/1993 | Asbury et al. |
| 5,235,316 A | 8/1993 | Qualizza |
| 5,243,358 A * | 9/1993 | Sanford et al. ...... 343/700 MS |
| 5,249,027 A | 9/1993 | Mathur et al. |
| 5,249,157 A | 9/1993 | Taylor |
| 5,252,981 A | 10/1993 | Grein et al. |
| 5,268,692 A | 12/1993 | Grosch et al. |
| 5,280,288 A | 1/1994 | Sherry et al. |
| 5,285,207 A | 2/1994 | Asbury et al. |
| 5,302,956 A | 4/1994 | Asbury et al. |
| 5,315,303 A | 5/1994 | Tsou et al. |
| 5,325,096 A | 6/1994 | Pakett |
| 5,325,097 A | 6/1994 | Zhang et al. |
| 5,339,075 A | 8/1994 | Abst et al. |
| 5,341,144 A | 8/1994 | Stove |
| 5,351,044 A | 9/1994 | Mathur et al. |
| RE34,773 E | 11/1994 | Dombrowski |
| 5,390,118 A | 2/1995 | Margolis et al. |
| 5,394,292 A | 2/1995 | Hayashida |
| 5,396,252 A | 3/1995 | Kelly |
| 5,400,864 A | 3/1995 | Winner et al. |
| 5,410,745 A | 4/1995 | Friesen et al. |
| 5,414,643 A | 5/1995 | Blackman et al. |
| 5,451,960 A | 9/1995 | Kastella et al. |
| 5,454,442 A | 10/1995 | Labuhn et al. |
| 5,467,072 A | 11/1995 | Michael |
| 5,467,283 A | 11/1995 | Butsuen et al. |
| 5,471,214 A | 11/1995 | Faibish et al. |
| 5,479,173 A | 12/1995 | Yoshioka et al. |
| 5,481,268 A | 1/1996 | Higgins |
| 5,483,453 A | 1/1996 | Uemura et al. |
| 5,485,155 A | 1/1996 | Hibino |
| 5,485,159 A | 1/1996 | Zhang et al. |
| 5,486,832 A | 1/1996 | Hulderman |
| 5,493,302 A | 2/1996 | Woll et al. |
| 5,495,252 A | 2/1996 | Adler |
| 5,508,706 A | 4/1996 | Tsou et al. |
| 5,517,196 A | 5/1996 | Pakett et al. |
| 5,517,197 A | 5/1996 | Algeo et al. |
| 5,521,579 A | 5/1996 | Bernhard |
| 5,530,447 A | 6/1996 | Henderson et al. |
| 5,572,428 A | 11/1996 | Ishida et al. |
| 5,583,495 A | 12/1996 | Ben Lulu |
| 5,587,908 A | 12/1996 | Kajiwara |
| 5,613,039 A | 3/1997 | Wang et al. |
| 5,619,208 A | 4/1997 | Tamatsu et al. |
| 5,625,362 A | 4/1997 | Richardson |
| 5,627,510 A | 5/1997 | Yuan |
| 5,633,642 A | 5/1997 | Hoss et al. |
| 5,654,715 A | 8/1997 | Hayashikura et al. |
| 5,670,963 A | 9/1997 | Kubota et al. |
| 5,675,345 A | 10/1997 | Pozgay et al. |
| 5,678,650 A | 10/1997 | Ishihara et al. |
| 5,689,264 A | 11/1997 | Ishikawa et al. |
| 5,712,640 A | 1/1998 | Andou et al. |
| 5,715,044 A | 2/1998 | Hayes |
| 5,717,399 A | 2/1998 | Urabe et al. |
| 5,719,580 A | 2/1998 | Core |
| 5,731,778 A | 3/1998 | Nakatani et al. |
| 5,734,344 A | 3/1998 | Yamada |
| 5,757,074 A | 5/1998 | Matloubian et al. |
| 5,757,307 A | 5/1998 | Nakatani et al. |
| 5,767,793 A | 6/1998 | Agravante et al. |
| 5,771,007 A | 6/1998 | Arai et al. |
| 5,777,563 A | 7/1998 | Minissale et al. |
| 5,805,103 A | 9/1998 | Doi et al. |
| 5,808,561 A | 9/1998 | Kinoshita et al. |
| 5,808,728 A | 9/1998 | Uehara |
| 5,818,355 A | 10/1998 | Shirai et al. |
| 5,839,534 A | 11/1998 | Chakraborty et al. |
| 5,886,671 A * | 3/1999 | Riemer et al. ....... 343/700 MS |
| 5,905,472 A | 5/1999 | Wolfson et al. |
| 5,923,280 A | 7/1999 | Farmer |
| 5,926,126 A | 7/1999 | Engelman |
| 5,929,802 A | 7/1999 | Russell et al. |
| 5,938,714 A | 8/1999 | Santonaka |
| 5,940,011 A | 8/1999 | Agravante et al. |
| 5,949,366 A | 9/1999 | Herrmann |
| 5,959,570 A | 9/1999 | Russell |
| 5,977,904 A | 11/1999 | Mizuno et al. |
| 5,978,736 A | 11/1999 | Greendale |
| 5,999,092 A | 12/1999 | Smith et al. |
| 5,999,119 A | 12/1999 | Carnes et al. |
| 5,999,874 A | 12/1999 | Winner et al. |
| 6,011,507 A | 1/2000 | Curran et al. |
| 6,018,308 A | 1/2000 | Shirai |
| 6,026,347 A | 2/2000 | Schuster |
| 6,026,353 A | 2/2000 | Winner |
| 6,028,548 A | 2/2000 | Farmer |
| 6,037,860 A | 3/2000 | Zander et al. |
| 6,037,894 A | 3/2000 | Pfizenmaier et al. |
| 6,040,796 A | 3/2000 | Matsugatani et al. |
| 6,043,772 A | 3/2000 | Voigtlaender et al. |
| 6,049,257 A | 4/2000 | Hauk |
| 6,052,080 A | 4/2000 | Magori |
| 6,057,797 A | 5/2000 | Wagner |
| 6,069,581 A | 5/2000 | Bell et al. |
| 6,070,682 A | 6/2000 | Isogai et al. |
| 6,075,492 A | 6/2000 | Schmidt et al. |
| 6,076,622 A | 6/2000 | Chakraborty et al. |
| 6,085,151 A | 7/2000 | Farmer et al. |
| 6,087,975 A | 7/2000 | Sugimoto et al. |
| 6,091,355 A | 7/2000 | Cadotte, Jr. et al. |
| 6,097,331 A | 8/2000 | Matsugatani et al. |
| 6,097,931 A | 8/2000 | Weiss et al. |
| 6,104,336 A | 8/2000 | Curran et al. |
| 6,107,956 A | 8/2000 | Russell et al. |
| 6,114,985 A | 9/2000 | Russell et al. |
| 6,127,965 A | 10/2000 | McDade et al. |
| 6,130,607 A | 10/2000 | McClanahan et al. |
| 6,147,637 A | 11/2000 | Morikawa et al. |
| 6,147,638 A | 11/2000 | Rohling et al. |
| 6,154,168 A | 11/2000 | Egawa et al. |
| 6,154,176 A * | 11/2000 | Fathy et al. ......... 343/700 MS |

| | | | |
|---|---|---|---|
| 6,161,073 A | 12/2000 | Tange et al. | |
| 6,163,252 A | 12/2000 | Nishiwaki | |
| 6,184,819 B1 | 2/2001 | Adomat et al. | |
| 6,188,950 B1 | 2/2001 | Tsutsumi et al. | |
| 6,198,426 B1 | 3/2001 | Tamatsu et al. | |
| 6,198,434 B1 | 3/2001 | Martek et al. | |
| 6,215,438 B1 | 4/2001 | Oswald et al. | |
| 6,225,918 B1 | 5/2001 | Kam | |
| 6,232,910 B1 | 5/2001 | Bell et al. | |
| 6,233,516 B1 | 5/2001 | Egawa | |
| 6,252,560 B1 | 6/2001 | Tanaka et al. | |
| 6,255,984 B1 | 7/2001 | Kreppold et al. | |
| 6,256,573 B1 | 7/2001 | Higashimata | |
| 6,259,395 B1 | 7/2001 | Adachi et al. | |
| 6,265,990 B1 | 7/2001 | Isogai et al. | |
| 6,269,298 B1 | 7/2001 | Seto | |
| 6,278,400 B1 | 8/2001 | Cassen et al. | |
| 6,307,622 B1 | 10/2001 | Lewis | |
| 6,317,073 B1 | 11/2001 | Tamatsu et al. | |
| 6,317,075 B1 | 11/2001 | Heide et al. | |
| 6,317,090 B1 | 11/2001 | Nagy et al. | |
| 6,320,547 B1 | 11/2001 | Fathy et al. | |
| 6,327,530 B1 | 12/2001 | Nishimura et al. | |
| 6,329,952 B1 | 12/2001 | Grace | |
| 6,330,507 B1 | 12/2001 | Adachi et al. | |
| 6,335,705 B1 | 1/2002 | Grace et al. | |
| 6,345,227 B1 | 2/2002 | Egawa et al. | |
| 6,351,702 B1 | 2/2002 | Tange et al. | |
| 6,366,235 B1 | 4/2002 | Mayer et al. | |

FOREIGN PATENT DOCUMENTS

| | | |
|---|---|---|
| DE | 198 50 128 | 5/1999 |
| EP | 0 398 712 | 5/1990 |
| EP | 0 484 995 | 5/1992 |
| EP | 0 642 190 A1 | 12/1993 |
| EP | 0 784 213 | 1/1996 |
| EP | 0 887 658 | 12/1998 |
| EP | 0 932 052 | 7/1999 |
| EP | 0 978 729 A2 | 2/2000 |
| EP | 0 982 173 | 3/2000 |
| EP | 1 020 989 | 7/2000 |
| FR | 2 709 834 | 9/1993 |

OTHER PUBLICATIONS

Das, Nirod K. et al. "Multiport Scattering Analysis of General Multilayered Printed Antennas Fed by Multiple Feed Ports: Part II–Applications", IEEE, 1992, pp. 482–491.

Katehi, Pisti B. et al. "Design of a Low Sidelobe Level Stripline Fed Slot Array Covered by a Dielectric Layer", 1989, pp. 978–981.

Kimura, Yuichi et al. "Alternating Phase Single–Layer Slotted Waveguide Arrays at 25GHz Band", IEEE, 1999, pp. 142–145.

Muir, A., "Analysis of Sripline/Slot Transition", Electronics Letter, vol. 26 No. 15, pp. 1160–1161.

Sakaibara, Kunio et al. "A Single Slotted Waveguide Array for 22GHz Band Radio System Between Mobile Base Station", IEEE, 1994, pp. 356–359.

Sangster, Alan et al. "A Moment Method Analysis of a Transverse Slot Fed by a Boxed Stripline", (No Date) pp. 146–149.

Schaubert, Daniel H. et al. "Moment Method Analysis of Infinite Stripline–Fed Tapered Slot Antenna Arrays with a Ground Plane", IEEE Transactions on Antennas and Propagation, vol. 42, No. 8, Aug. 1994, pp. 1161.

Smith, Peter "Transverse Slot Radiator in the Ground–Plane of Enclosed Stripline", $10^{th}$ International Conference on Antennas and Propagation 14.17, Apr. 1997, 5 pages.

Theron, Isak Petrus et al. "On Slotted Waveguide Antenna Design at Ka–Band", IEEE Trans. vol. 32, Oct. 1984, pp. 1425–1426.

G.S. Dow, et al. "Monolithic Receivers with Integrated Temperature Compensation Function", IEEE GaAs IC Symposium, 1991, pp. 267–269.

\* cited by examiner

SWITCHED BEAM ANTENNA ARCHITECTURE

CROSS-REFERENCE TO RELATED APPLICATIONS

This application claims the benefit of U.S. Provisional Application No. 60/226,160, filed on Aug. 16, 2000 and is hereby incorporated herein by reference in its entirely.

STATEMENTS REGARDING FEDERALLY SPONSORED RESEARCH

Not applicable.

FIELD OF THE INVENTION

This invention relates to antenna elements and more particularly to an antenna element for use in an array antenna.

BACKGROUND OF THE INVENTION

As is known in the art, there is an increasing trend to include radar systems in commercially available products. For example, it is desirable to include radar systems in automobiles, trucks boats, airplanes and other vehicles. Such radar systems must be compact and relatively low cost.

Furthermore, some applications have relatively difficult design parameters including restrictions on the physical size of the structure in addition to minimum operational performance requirements. Such competing design requirements (e.g. low cost, small size, high performance parameters) make the design of such radar systems relatively challenging. Among, the design challenges is a challenge to provide an antenna system which meets the design goals of being low cost, compact and high performance.

In automotive radar systems, for example, cost and size considerations are of considerable importance. Furthermore, in order to meet the performance requirements of automotive radar applications, (e.g. coverage area) an array antenna is required. Some antenna elements which have been proposed for use in antenna arrays manufactured for automotive radar applications include patch antenna elements, printed dipole antenna elements and cavity backed patch antenna elements. Each of these antenna elements have one or more drawbacks when used in an automotive radar application.

For example, patch antenna elements and cavity backed patch antenna elements each require a relatively large amount of substrate area and thickness. Array antennas for automotive applications, however, have only a limited amount of area for reasons of compactness and cost. Thus, antenna elements which can operate in a high density circuit are required. Printed dipole antennas can operate in a high density circuit environment, however, array antennas provided from printed dipole antenna elements give rise to "blind spots" in the antenna radiation pattern.

It would, therefore, be desirable to provide an antenna element which is compact, which can operate in a high density circuit environment, which is relatively low cost and which can be used to provide an array antenna having relatively high performance characteristics.

SUMMARY OF THE INVENTION

In accordance with the present invention, an antenna element includes a cover layer disposed over a radiator layer having a first ground plane disposed thereon with the ground plane having an aperture therein. The radiator layer is disposed over a feed circuit layer which has a second ground plane disposed thereon. A cavity is provided in the radiator and feed circuit layers by disposing a plurality of via holes between the first and second ground plane layers. An antenna element feed couples energy between the feed circuit and the antenna element. A feed circuit couples energy between the antenna element feed and a butler matrix and is provided as an elevation feed which is interlaced between each of the antenna elements. With this particular arrangement, a compact slotted antenna element which utilizes a stripline-fed open ended dielectric filled cavity is provided. In one embodiment, the antenna element is provided from Low Temperature Co-fired Ceramic (LTCC) circuit substrates on which the multiple antenna elements can be disposed to provide a compact array antenna capable of switching between multiple antenna beams. The antenna element of the present invention requires only five layers and thus can be provided as a relatively low cost antenna. The radiator layers can be provided having capacitive windows formed therein for tuning the antenna element. By providing the feed circuit as an elevation feed which is interlaced between each of the antenna elements, a compact antenna which can operate in a densely packed environment is provided. A multiple beam array antenna was designed to radiate at 24 GHz. The entire antenna was fabricated in a single Low Temperature Co-fired Ceramic (LTCC) circuit. The design of the antenna included the radiating element (stripline-fed open-ended waveguide), the beam forming network (Butler Matrix), radiator feed circuit, quadrature hybrid, power dividers, and interlayer transitions.

In accordance with a further aspect of the present invention, an array antenna comprises a plurality of slotted antenna elements, each of which utilizes a stripline-fed open ended dielectric filled cavity. With this particular arrangement, a compact array antenna which can provide multiple beams is provided. The antenna can be used in a sensor utilized in an automotive radar application. In a preferred embodiment, the sensor includes a transmit and a receive antenna. In a preferred embodiment, the transmit and receive antennas are provided as a bi-static antenna pair disposed on a single substrate. In other embodiments, however, a monostatic arrangement can be used.

In accordance with a still further aspect of the present invention, a switched beam antenna system includes a plurality of antenna elements, a Butler matrix having a plurality of antenna ports and a plurality of switch ports with each of the antenna ports coupled to a respective one of the plurality of antenna elements and a switch circuit having an input port and a plurality of output ports each of the switch output ports coupled to a respective one of the plurality of switch ports of the Butler matrix. With this particular arrangement, a multiple beam switched beam antenna system is provided. By providing the antenna elements from a single Low Temperature Co-fired Ceramic (LTCC) substrate, the antenna system can be provided as a compact antenna system. In a preferred embodiment the radiating element are provided from stripline-fed open-ended waveguide fabricated in the LTCC substrate and the Butler matrix, radiator feed circuit, quadrature hybrid, power dividers, and interlayer transitions are also provided in the LTCC substrate.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Figure 1:
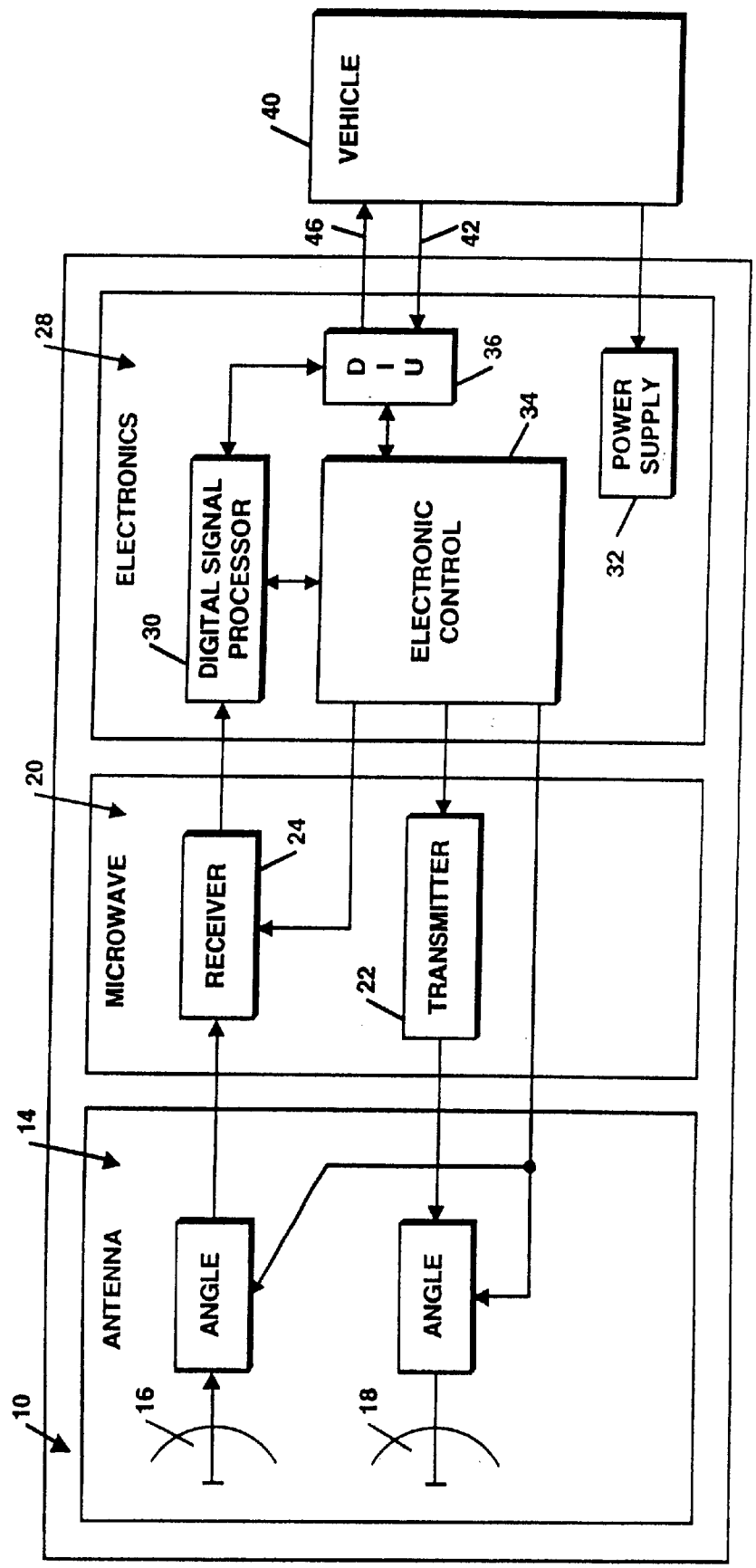
FIG. 1 is a block diagram of a radar system.

Referring to FIG. 1, a radar system 10 includes an antenna portion 14, a microwave portion 20 having both a transmitter 22 and a receiver 24, and an electronics portion 28 containing a digital signal processor (DSP) 30, a power supply 32, control circuits 34 and a digital interface unit (DIU) 36. The transmitter 22 includes a digital ramp signal generator for generating a control signal for a voltage controlled oscillator (VCO), as will be described.

The radar system 10 utilizes radar technology to detect one or more objects, or targets in the field of view of the system 10 and may be used in various applications. In the illustrative embodiment, the radar system 10 is a module of an automotive radar system (FIG. 2) and, in particular, is a side object detection (SOD) module or system adapted for mounting on an automobile or other vehicle 40 for the purpose of detecting objects, including but not limited to other vehicles, trees, signs, pedestrians, and other objects which can be located proximate a path on which the vehicle is located. As will be apparent to those of ordinary skill in the art, the radar system 10 is also suitable for use in many different types of applications including but not limited to marine applications in which radar system 10 can be disposed on a boat, ship or other sea vessel.

The transmitter 22 operates as a Frequency Modulated Continuous Wave (FMCW) radar, in which the frequency of the transmitted signal linearly increases from a first predetermined frequency to a second predetermined frequency. FMCW radar has the advantages of high sensitivity, relatively low transmitter power and good range resolution. However, it will be appreciated that other types of transmitters may be used.

Control signals are provided by the vehicle 40 to the radar system 10 via a control signal bus 42 and may include a yaw rate signal corresponding to a yaw rate associated with the vehicle 40 and a velocity signal corresponding to the velocity of the vehicle. The DSP 30 processes these control signals and radar return signals received by the radar system 10, in order to detect objects within the field of view of the radar system, as will be described in conjunction with FIGS. 10–16. The radar system 10 provides to the vehicle one or more output signals characterizing an object within its field of view via an output signal bus 46 to the vehicle. These output signals may include a range signal indicative of a range associated with the target, a range rate signal indicative of a range rate associated with the target and an azimuth signal indicative of the azimuth associated with the target relative to the vehicle 40. The output signals may be coupled to a control unit of the vehicle 40 for various uses such as in an intelligent cruise control system or a collision avoidance system.

The antenna assembly 14 includes a receive antenna 16 for receiving RF signals and a transmit antenna 18 for transmitting RF signals. The radar system 10 may be characterized as a bistatic radar system since it includes separate transmit and receive antennas positioned proximate one another. The antennas 16, 18 provide multiple beams at steering angles that are controlled in parallel as to point a transmit and a receive beam in the same direction. Various circuitry for selecting the angle of the respective antennas 16, 18 is suitable, including a multi-position switch.

Figure 2:
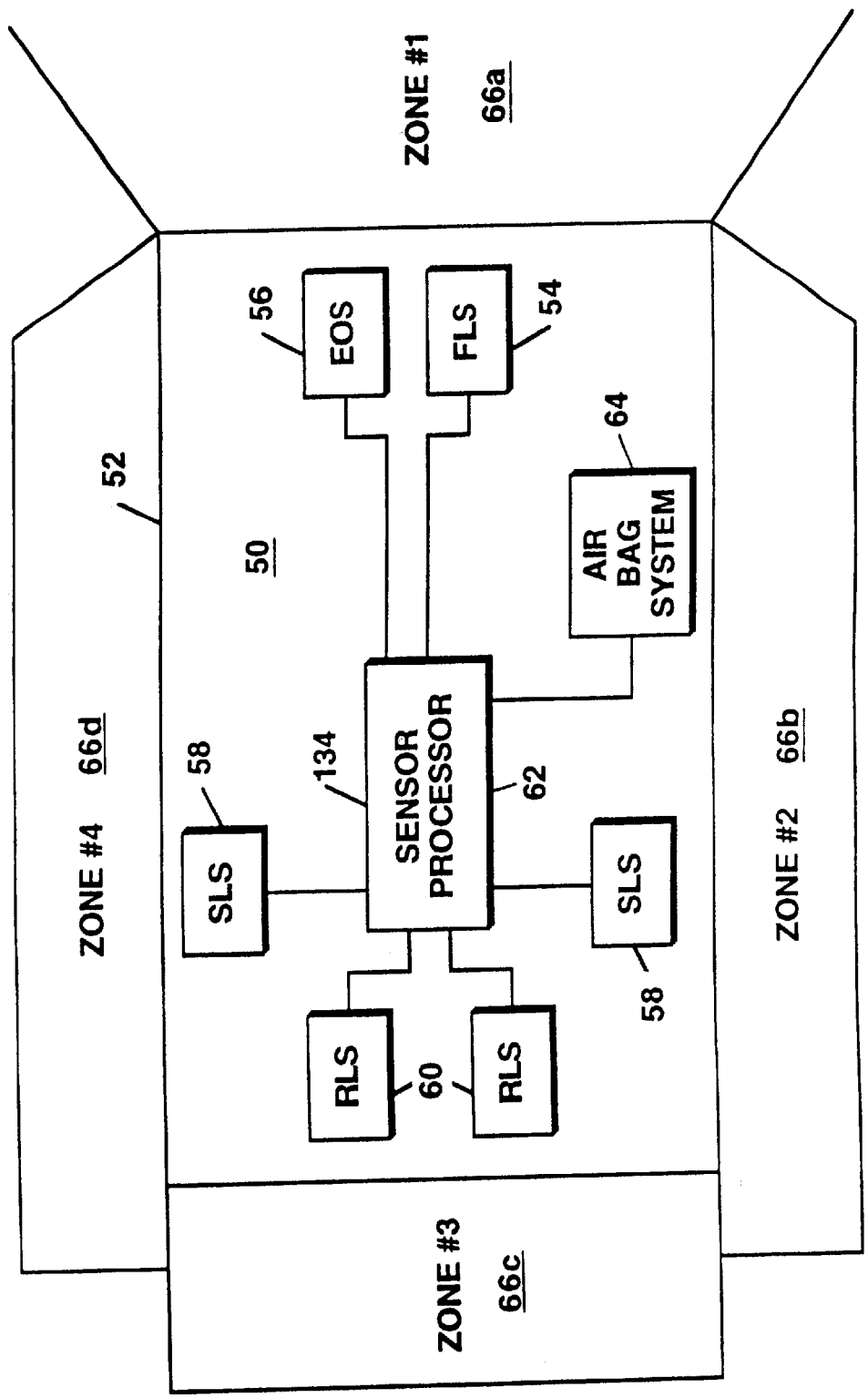
FIG. 2 is a block diagram of an automotive near object detection (NOD) system including a plurality of radar systems.

Referring now to FIG. 2, an illustrative application for the radar system 10 of FIG. 1 is shown in the form of an automotive near object detection (NOD) system 50. The NOD system 50 is disposed on a vehicle 52 which may be provided for example, as an automotive vehicle such as car, motorcycle, or truck, or a marine vehicle such as a boat or an underwater vehicle or as an agricultural vehicle such as a harvester. In this particular embodiment, the NOD system 50 includes a forward-looking sensor (FLS) system 54 which may be of the type described in U.S. Pat. No. 5,929,802, an electro-optic sensor (EOS) system 56, a plurality of side-looking sensor (SLS) systems 58 or equivalently side object detection (SOD) systems 58 and a plurality of rear-looking sensor (RLS) systems 60. In the illustrative embodiment, the radar system 10 of FIG. 1 is a SOD system 58.

Each of the FLS, EOS, SLS, and RLS systems is coupled to a sensor processor 62. In this particular embodiment, the sensor processor 62 is shown as a central processor to which each of the FLS, EOS, SLS, and RLS systems is coupled via a bus or other means. It should be appreciated that in an alternate embodiment, one or more of the FLS, EOS, SLS, and RLS systems may include its own processors, such as the DSP 30 of FIG. 1, to perform the processing described below. In this case, the NOD system 100 would be provided as a distributed processor system.

Regardless of whether the NOD system 50 includes a single or multiple processors, the information collected by each of the sensor systems 54, 56, 58 60 is shared and the processor 62 (or processors in the case of a distributed system) implements a decision or rule tree. The NOD system 50 may be used for a number of functions including but not limited to blind spot detection, lane change detection, pre-arming of vehicle air bags and to perform a lane stay function. For example, the sensor processor 62 may be coupled to the airbag system 64 of the vehicle 52. In response to signals from one or more of the FLS, EOS, SLS, and RLS systems, the sensor processor 62 determines whether it is appropriate to "pre-arm" the airbag of the vehicle. Other examples are also possible.

The EOS system 56 includes an optical or IR sensor or any other sensor which provides relatively high resolution in the azimuth plane of the sensor. The pair of RLS systems 60 can utilize a triangulation scheme to detect objects in the rear portion of the vehicle. The FLS system 54 may be of the type described in U.S. Pat. No. 5,929,802 entitled Automotive Forward Looking Sensor Architecture, issued Jul. 27, 1999, assigned to the assignee of the present invention, and incorporated herein by reference. It should be appreciated that each of the SLS and RLS sensors 58, 60 may be provided having the same antenna system.

Each of the sensor systems is disposed on the vehicle 52 such that a plurality of coverage zones exist around the vehicle. Thus, the vehicle is enclosed in a cocoon-like web or wrap of sensor zones. With the particular configuration shown in FIG. 2, four coverage zones 66a–66d are used. Each of the coverage zones 66a–66d utilizes one or more RF detection systems. The RF detection system utilizes an antenna system which provides multiple beams in each of the coverage zones 66a–66d. In this manner, the particular direction from which another object approaches the vehicle or vice-versa can be found.

It should be appreciated that the SLS, RLS, and the FLS systems may be removably deployed on the vehicle. That is, in some embodiments the SLS, RLS, and FLS sensors may be disposed external to the body of the vehicle (i.e. on an exposed surface of the vehicle body), while in other systems the SLS, RLS, and FLS systems may be embedded into bumpers or other portions of vehicle (e.g. doors, panels, quarter panels, vehicle front ends, and vehicle rear ends). It is also possible to provide a system which is both mounted inside the vehicle (e.g., in the bumper or other location) and which is also removable. The system for mounting can be of a type described in U.S. patent application Ser. No. 09/931,276, entitled Portable Object Detection System filed Aug. 16, 2001 or in U.S. patent application Ser. No. 09/930,868, entitled System and Technique for Mounting a Radar System on a Vehicle filed Aug. 16, 2001. Each of the above-identified patent applications assigned to the assignee of the present invention, and each incorporated herein by reference.

Figure 3:
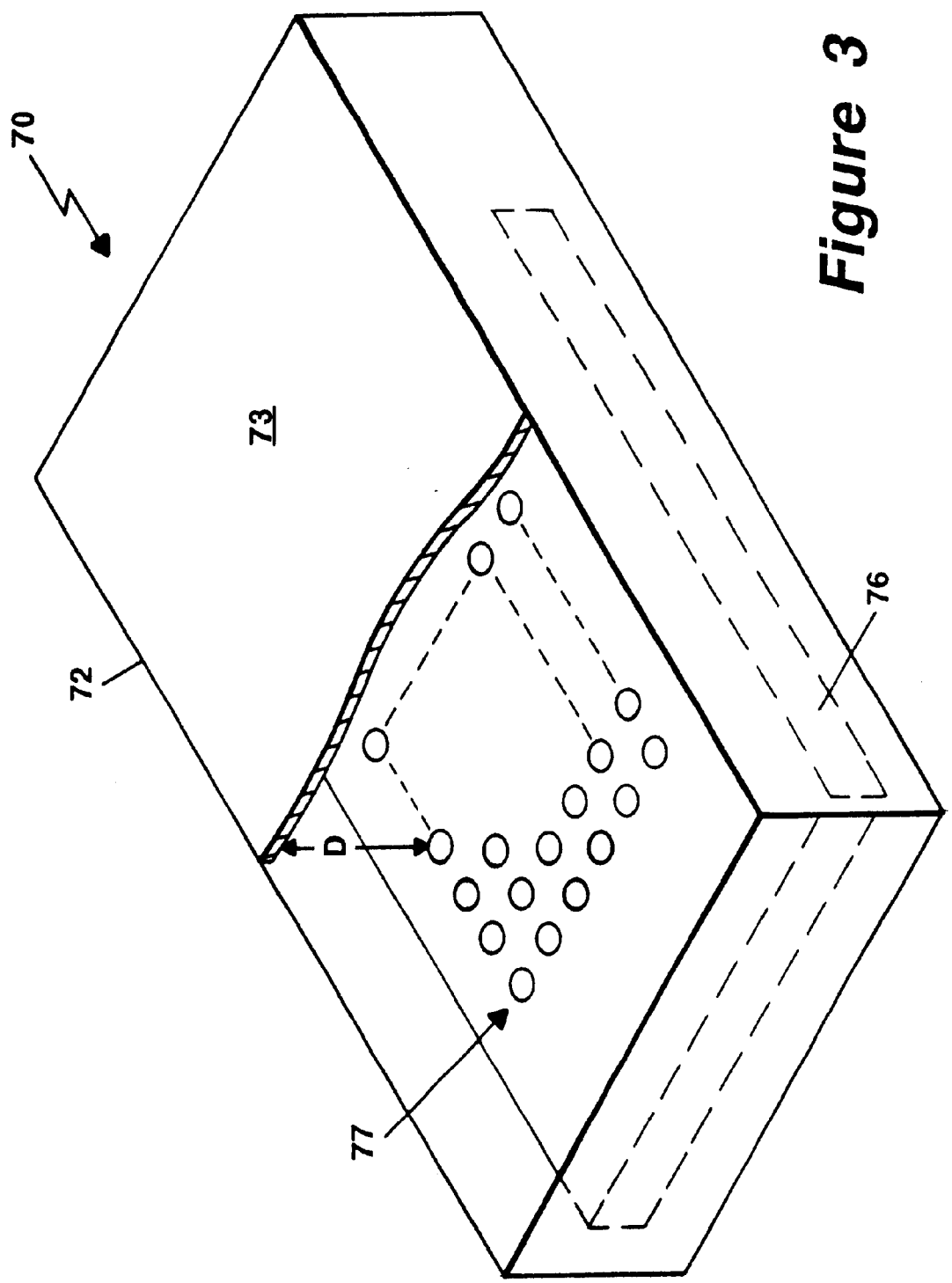
FIG. 3 is a perspective view of a side object detection (SOD) system.

Referring now to FIG. 3, a side object detection (SOD) system 70 includes a housing 72 in which the SOD electronics are disposed. A portion of the housing has here been removed to reveal a single substrate 76 on which a plurality of antenna elements 77 are disposed. A preferred antenna array and antenna element will be described in conjunction with FIGS. 9–11 below. In this particular embodiment, the substrate 76 is provided as Low Temperature Co-fired Ceramic (LTCC) substrate 76. As will be described in detail below in conjunction with FIGS. 10 and 11, the single substrate 76 can be provided from a plurality of LTCC layers.

Also provided in the LTTC substrate 76 is a Butler matrix beam forming circuit, a radiator feed circuit coupled to the antenna elements 75, a plurality of quadrature hybrid and power divider circuits as well as interlayer transition circuits.

In one embodiment, the housing 72 for the antenna is provided from an injection molded plastic PBT (polybutylene terephthalate) having a relative dielectric constant ($\epsilon_r$) of about 3.7. The housing 72 includes a cover 73. One characteristic of cover 73 that affects antenna performance is the cover thickness. In a preferred embodiment, the cover thickness is set to one-half wavelength (0.5 $\lambda$) as measured in the dielectric. At an operating frequency of about 24 GHz, this corresponds to a cover thickness of about 0.125 inch. The antenna aperture is preferably spaced from the cover 73 by a distance D (measure from the antenna aperture to an inner surface of the cover 73) which corresponds to a distance slightly less than about 0.5 $\lambda$ as measured in air. At an operating frequency of about 24 GHz, this corresponds to about 0.2 inch. Other dimensions of the cover 73 are selected based on structure and manufacturing. The housing 72 is provided having a recess region in which the substrate 76 is disposed. The housing may be of the type described in co-pending U.S. patent application Ser. No. 09/931,277, entitled Highly Integrated Single Substrate MMW Multi-Beam Sensor, filed Aug. 16, 2001, assigned to the assignee of the present invention and incorporated herein by reference in its entirety.

In one embodiment, the antenna is built using Ferro's A6-M LTCC tape. The tape is provided havibg a thickness of about 0.010 inch pre-fired and 0.0074 inch post-fired and a dielectric constant of about 5.9. The LTTC tape has a loss characteristic at 24 GHz of 1.0 dB(more like 1.1 dB) per inch for a 0.0148 inch ground plane spacing.

LTCC was chosen for this antenna for a variety of reasons including but not limited to its potential for low cost in high volume production. Furthermore, LTCC allows compact circuit design and is compatible technology (at this frequency) for multi-layer circuits having relativley large quantities of reliable, embedded vias (approximately 1200 vias in oneparticualr embodiment of this antenna). Surface-mount devices can also be integrated with LTCC.

Figure 4:
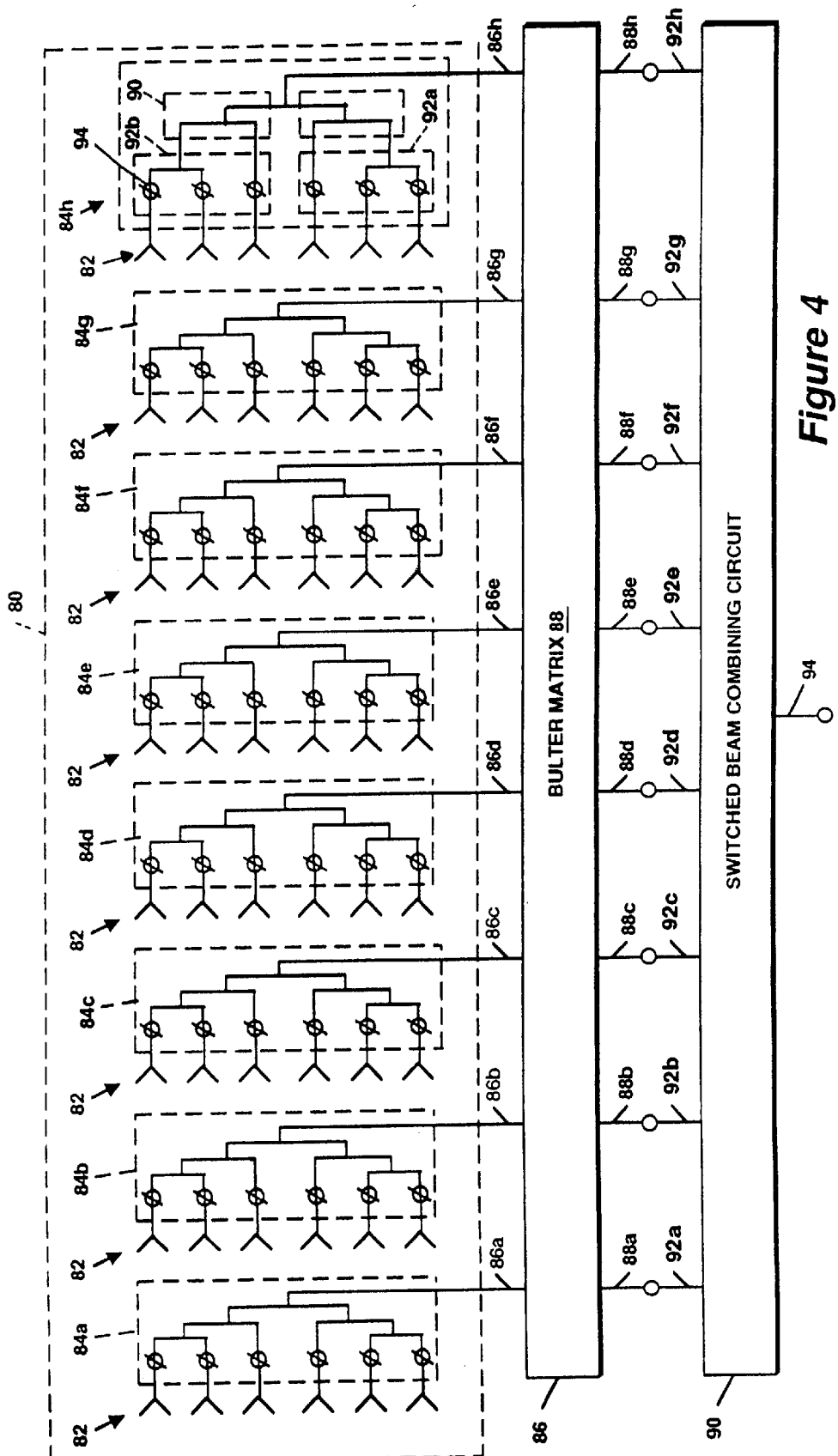
FIG. 4 is block diagram of a switched beam antenna system.

Referring now to FIG. 4, a switched beam antenna system includes an antenna 80 having a plurality of antenna elements 82. Each of the antenna elements 82 are coupled through a respective one of a plurality of elevation distribution networks 84a–84h to a respective one of a plurality of output ports 86a–86h of a Butler matrix beam forming network 88. As will be described in conjunction with FIGS. 5–7 below, a signal fed to predetermined ones of the input or beam port 88a–88h results in the antenna forming a beam which appears in a different beam location in an azimuth plane. Each of the elevation distribution networks 84 is comprised of a first two-to-one (2:1) power divider 90, which splits the power equally to two radiator feed circuits 92a, 92b.

In one embodiment, the radiator feed circuit is provided from a corporate feed that provides half of the amplitude distribution in elevation. Each feed circuit 92a, 92b is coupled, respectively, to three "radiating elements" or more simply "radiators" through signal paths having differential line lengths. These differential line lengths provide the appropriate phase shift for the elevation beam steer.

The Butler matrix input ports are coupled to output ports of a switched beam combining circuit 90 having a first plurality of switch ports 92a–92h coupled to corresponding ones of the Butler matrix ports 88a–88h and a common port 94 at which combined beams are provided as will be described below.

The ports 88a–88h of the Butler matrix 88 represent different antenna beam locations. These beams are independent and are simultaneously available. The location of the beams with respect to Butler port location is given in FIG. 7 where reference numbers 120a–120h represent the relative locations of the beams in space, and the beam numbers 1–8 (designated by reference numerals 121a–121h in FIG. 7) refer to the Butler input beam port numbers as given in FIG. 6 and similarly in FIG. 5, designated with reference numbers 102a–102h. It should be noted that adjacent beams (in space) are always located on opposite halves of the Butler input beam ports (left half of beams ports, 1, 2, 3 and 4 and right half of beam ports 5, 6, 7 and 8). The combination of adjacent orthogonal beams will give a resulting beam having a cosine aperture distribution, and therefore lower sidelobe levels. By placing a 4-way switch (such as switches 105, 106 in FIG. 5) each half of the Butler input beam ports access to any adjacent pair of beams is realized. The inputs of the two 4-way switches 105a and 106a (FIG. 5) are then combined through an equal power divider 108. In this way, the single input to the power divider 108a is connected to one of seven combined beams (designated as 124a–124g in FIG. 7A). The beam combinations in FIG. 7A, are represented by the numbered pairs (2,6), (6,4), (4,8), (8,1), (1,5), (5,3), (3,7). That is, beam 124a (FIG. 7A) is provided from the combination of beams 2 and 6 represented as (2, 6). Similarly, beam 124b (FIG. 7A) is provided from the combination of beams 6 and 4 represented as (6, 4); beam 124c (FIG. 7A) is provided from the combination of beams 4 and 8 represented as (4, 8); beam 124d (FIG. 7A) is provided from the combination of beams 8 and 1 represented as (8, 1); beam 12e (FIG. 7A) is provided from the combination of beams 1 and 5 represented as (1, 5); beam 124f (FIG. 7A) is provided from the combination of beams 5 and 3 represented as (5, 3); and beam 124g (FIG. 7A) is provided from the combination of beams 3 and 7 represented as (3, 7).

These numbered pairs also represent the switch location for left and right switches 105, 106 (FIG. 5), respectively. For example, if switch 105 is set to select port 1 designated as reference number 102a in FIG. 5) (i.e. provide a low impedance signal path between port 1 and switch port 105a) and switch 106 is set to select port 8 designated by reference number 102h in FIG. 5. The resulting combined beam at power divider port 108a is beam 8, 1 which is the center beam.

Figure 5:
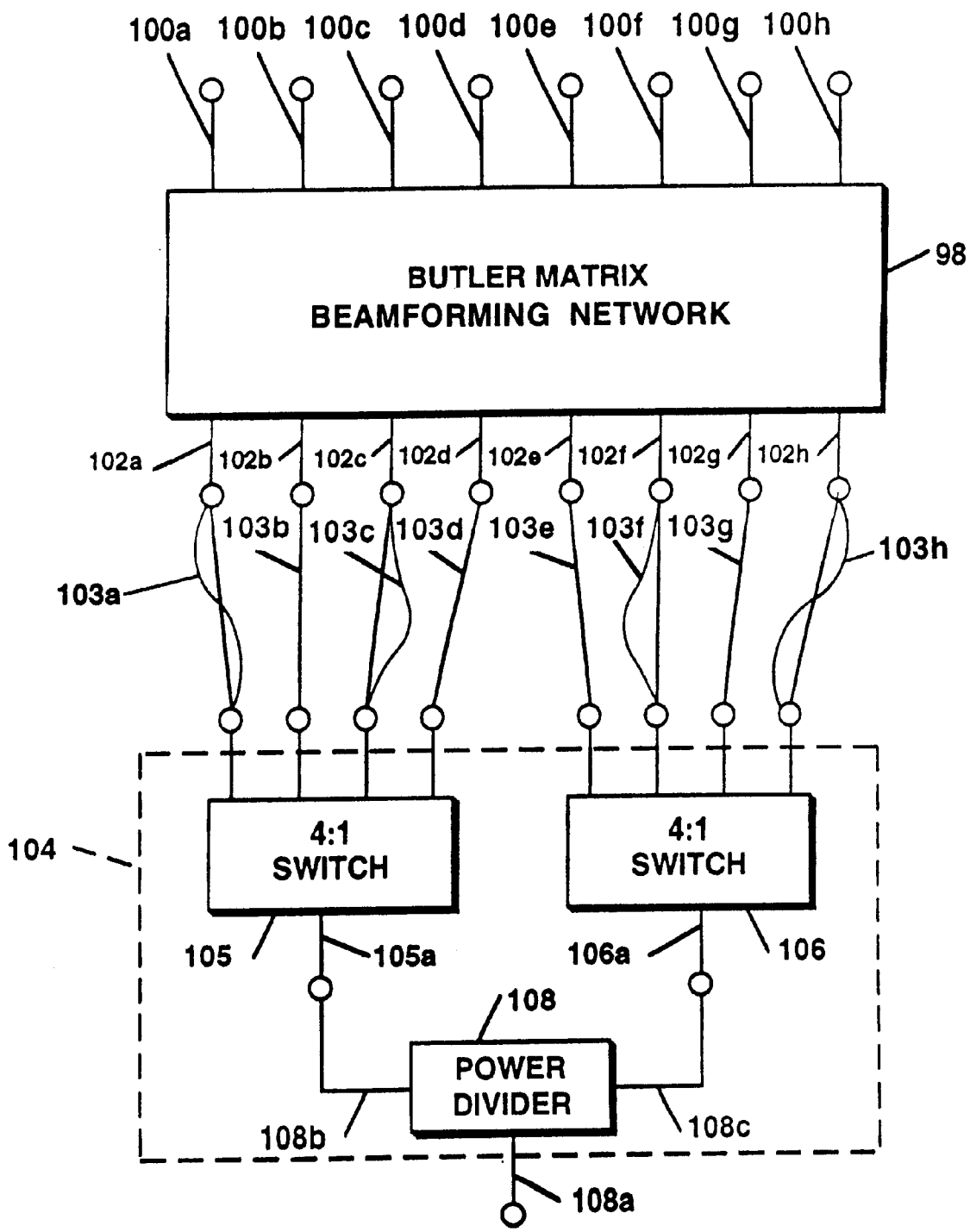
FIG. 5 is a block diagram of a switched beam forming circuit.

Referring now to FIG. 5, a Butler matrix beam forming network 98 is shown having a plurality of antenna element ports 100a–100h (which may correspond, for example, to ports 86a–86h of FIG. 4) and a plurality of switch ports 102a–102h (which may correspond, for example, to ports 88a–88h of FIG. 4). The switch ports 102a–102h are coupled through transmission lines 103a–103h to a switched beam combining circuit 104. As is known, the port phasing for Butlers have 180° phase difference and the curved signal paths 103a, 103c represent 180° differential line lengths required to bring all of the ports in phase with each other. The switched beam combining circuit 104 is here provided from a pair of single pole four throw switches 105, 106, each of the switches 105, 106 having a common port 105a, 106a coupled to the output port of a power divider circuit 108. The power divider circuit 108 is provided such that a signal fed to an input port 108a has an equal phase equal power level at the output ports 108b, 108c.

Figure 6:
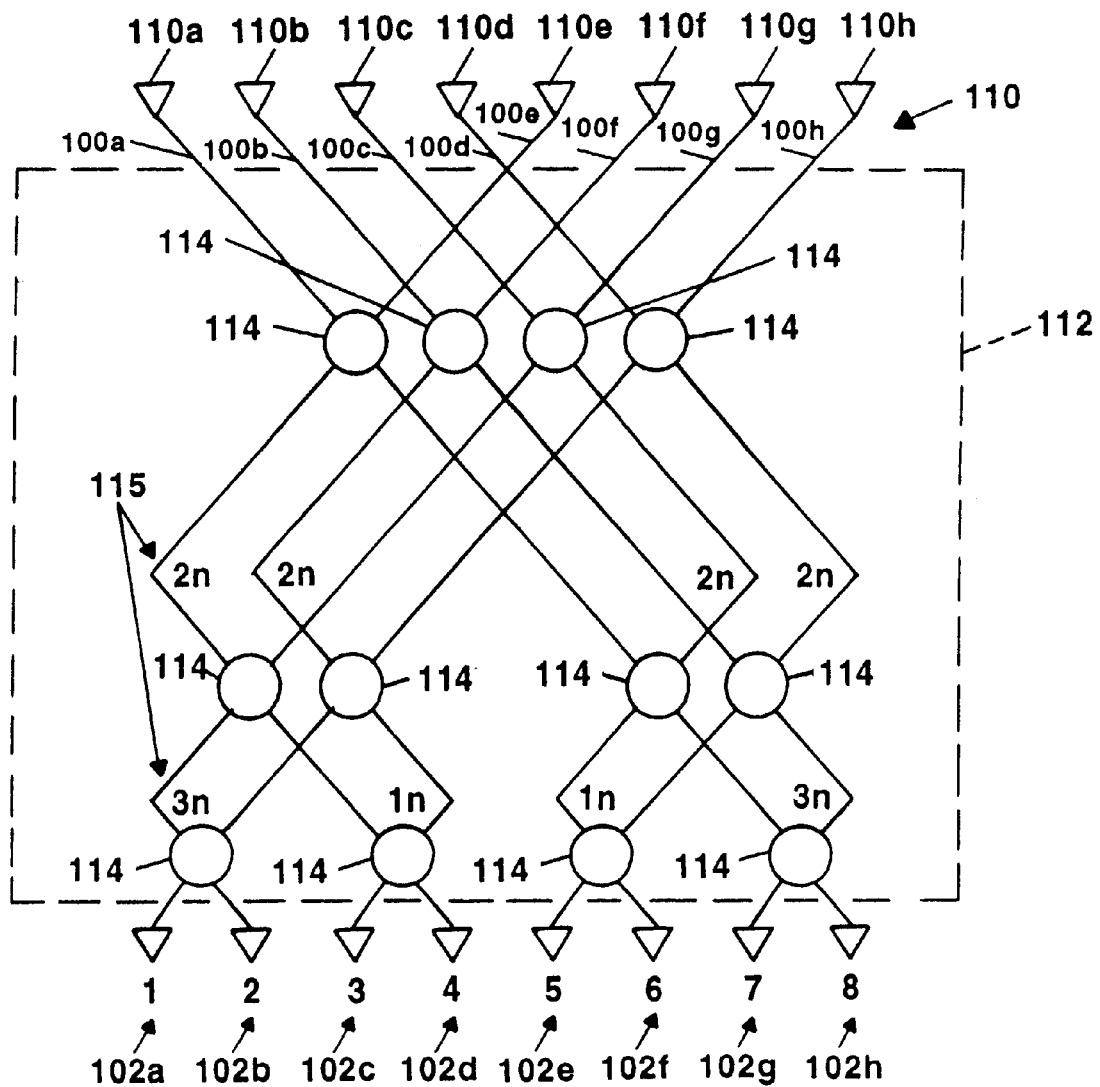
FIG. 6 is a block diagram of a Butler matrix beam forming circuit coupled to a plurality of antenna elements.

Referring now to FIG. 6, a plurality of antenna elements 110a–110h are coupled to ports 100a–100h of a Butler matrix beam forming network 112. The Butler matrix beam forming network 112 is here shown provided from a plurality of power divider circuits 114. The circuits 114 are provided as quadrature, or 90°, stripline ring hybrids which are coupled as shown to provide the Butler Matrix Circuit. These hybrids have a 3 dB power split with a 90° phase difference in the outputs of the through and coupled arms. The Butler matrix is a lossless beam forming network that forms orthogonal beams at fixed locations. The beam locations are a function of the spacing of the antenna elements in an antenna array (referred to as an array lattice spacing). In this particular embodiment, the Butler matrix 112 uses quadrature hybrid circuits 114 and fixed phase shifts to form the multiple beams. As will be explained in further detail below, the fixed phase shifts are provided from differential line lengths 115 where the path lengths are indicated by the 2n's, 3n's and 1n's in FIG. 6, where n=π/8 radians. Other techniques for providing the fixed phase shifts can also be used.

Typically, for narrow bandwidths, the fixed phase shifts are simply differential line lengths. The unit of phase shift is π/8 radians or λ/16. There are $2^N$ beams. Butler gives the following equation to calculate the beam locations:

$$beamloc(M) := a\sin\left[\frac{\lambda}{N \cdot d} \cdot \left(M - \frac{1}{2}\right)\right] \cdot \frac{180}{\pi}$$

where:

λ is the wavelength of the center frequency;

N is the number of elements;

d is the element spacing; and

M is the beam number.

Figure 7:
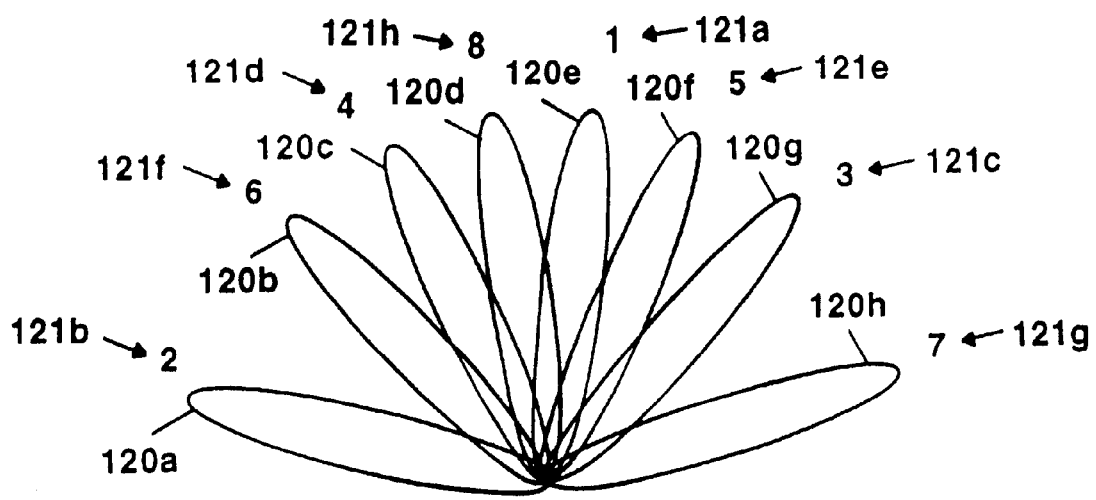
FIG. 7 is a plot of a Butler matrix beams.
Figure 7A:
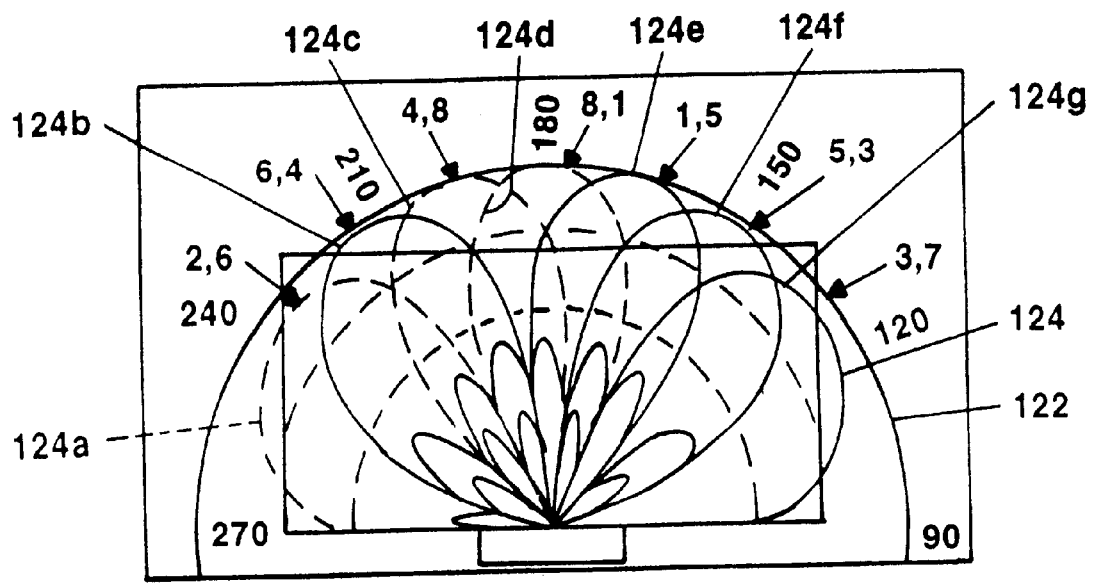
FIG. 7A is a plot of antenna system beams provided by combining predetermined ones of the Butler matrix beams.

Referring now to FIG. 7, in this particular embodiment, the Butler matrix forms eight beams 120a–120h. That is, by providing an input signal to one of the Butler matrix input ports 112a–112h, the antenna 110 produces a corresponding one of the beams 120a–120h. The calculations for determining the beam locations can be found using the equations below:

Wavelength (inches): $\lambda := \frac{11.81}{24}$

Number of Elements: $N := 8$

Element Spacing (Azimuth): $d := .223$

Beam Location (Degrees): $beamloc(M) := a\sin\left[\frac{\lambda}{N \cdot d} \cdot \left(M - \frac{1}{2}\right)\right] \cdot \frac{180}{\pi}$ Beam Number: $M := 1 \ldots \frac{N}{2}$ If the array is provided having an array lattice spacing of 0.223" in azimuth, the beam locations shown in FIG. 7 are provided. In one embodiment, the differential line length value, n is selected to be ¹⁄₁₆λ which corresponds to 0.0127 inch at a frequency of 24 GHz. FIG. 7 also illustrates which beam-ports in FIG. 6 produce which beams.

Referring now to FIG. 7A, a calculated antenna radiation pattern 122 includes seven beams 124a–124g which can be used in a radar system. The seven beams are provided by combining predetermined ones of the eight beams formed by the Butler Matrix as discussed above. Adjacent beams (e.g. beams 120a, 120b from FIG. 7) can be combined to produce beam 124a as illustrated in FIG. 7A. Since beams out of a Butler Matrix by definition are orthogonal, combining beams in azimuth produces a cos(θ) taper with a peak sidelobe level of 23 dB (with respect to the beam maximum).

The locations of the combined beams are listed in the Table below.

TABLE

| Combined Beam | Beam Location |
| --- | --- |
| 8, 1 | 0 |
| 4, 8 & 1, 5 | +/−16 |
| 6, 4 & 5, 3 | +/−34 |
| 2, 6 & 3, 7 | +/−57 |

In elevation, there is also a 25 dB Chebyshev taper and a 15° beam steer.

Figure 7B:
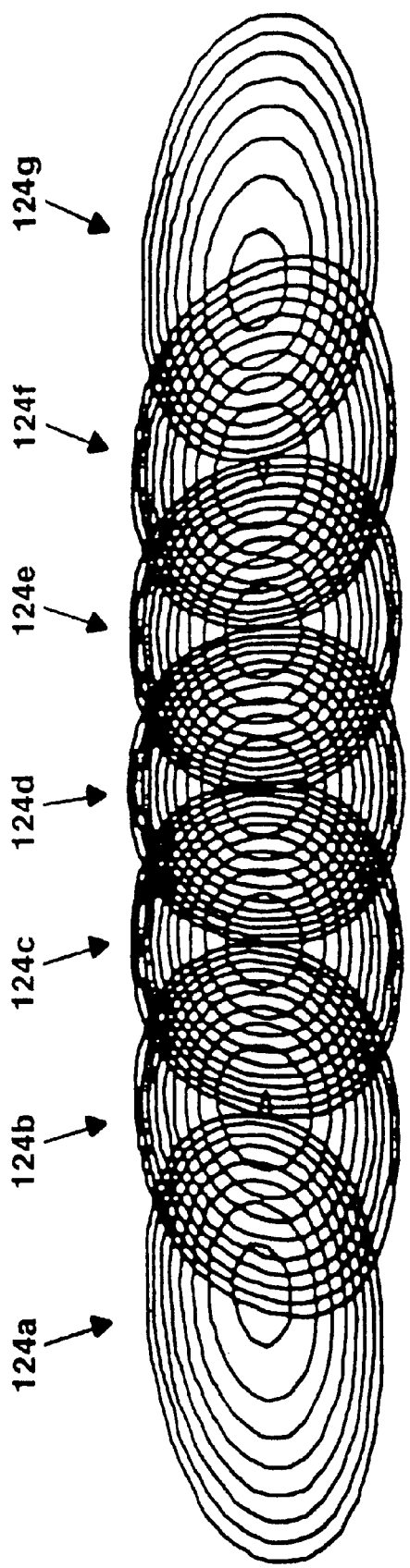
FIG. 7B is a plot of antenna system beams provided by combining predetermined ones of the Butler matrix beams.

Referring now to FIG. 7B, the resultant combined beam array factor is shown The combined beams are errorless contours in U-V space with a 20 dB floor. They assume a cos(θ) element factor. The plots are a representation of the seven combined beams in azimuth with the 15° beam steer in elevation.

It should be appreciated that producing the cos(θ) taper in azimuth with the adjacent beam combining was a cost driven design choice. Instead, the taper could have been produced using attenuators. However, these would have required the use of embedded resistors in the LTCC circuit. Using embedded resistors on an LTCC tape layer would add another processing step in the manufacture of the LTCC circuit. Therefore, using attenuators to produce the azimuth distribution would have increased the cost of the antenna. Moreover, the technique of the present invention simplifies the switch network by eliminating a 2-way switch.

Figure 8:
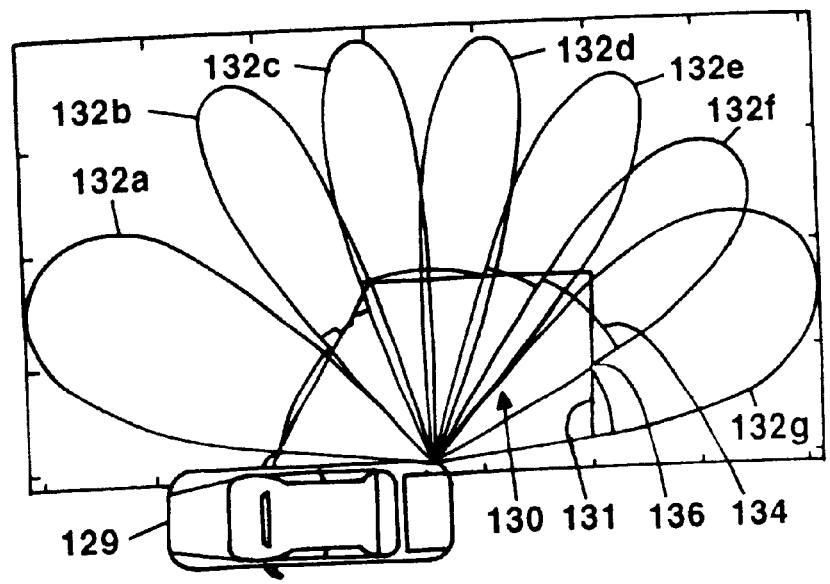
FIG. 8 is a diagrammatic view of a detection zone which can be provided by the SOD system of FIGS. 2A and 11.
Figure 8A:
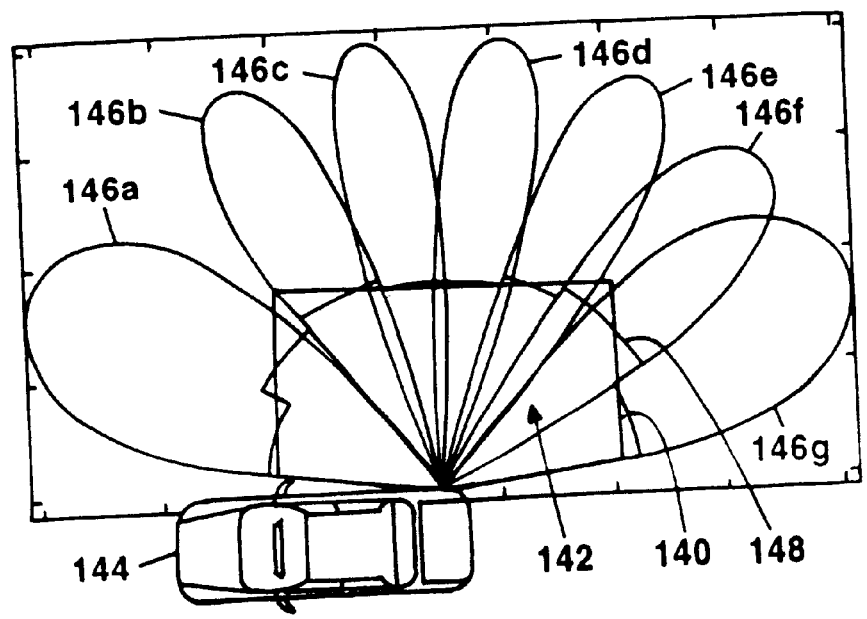
FIG. 8A is a diagrammatic view of a second detection zone which can be provided by the SOD system of FIGS. 3 and 11.

Referring now to FIGS. 8 and 8A, two different examples of side detection zones are shown. In FIG. 8, a vehicle 129 has a maximum detection zone 130 disposed thereabout. The maximum detection zone 130 is defined by a detection zone boundary 131. In this example, the maximum detection zone boundary 130 is provided having a trapezoidal shape. An exemplary SOD system provides seven azimuthal beams 132a–132g each with a different maximum detection range, as indicated by the shaded region, and as determined by a detection algorithm that operates upon the beam echoes. The algorithmic control of the maximum detection range of each of the eight beams defines the shape of an actual maximum detection zone boundary 134 versus a specified nominal detection zone boundary 136. The manner in which an object is detected is described in co-pending U.S. patent application Ser. No. 09/930,869, entitled Radar Detection Method and Apparatus, filed Aug. 16, 2001 assigned to the assignee of the present invention and incorporated herein by reference in its entirety.

The exemplary SOD system of FIGS. 8 and 8A, has seven beams, each with a beam width of approximately fifteen degrees and with a total azimuth scan of about one hundred fifty degrees. It will be recognized by one of ordinary skill in the art that other numbers of beams (e.g. fewer or more than seven) and scan angles are possible without departing from the present invention. The particular number of antenna beams to use in a particular application is selected in accordance with a variety of factors including but not limited to shape of coverage zone, size of coverage zone, required Azimuth resolution, complexity and cost.

Referring now to FIG. 8A, a boundary 140 having a substantially rectangular shape defines a detection zone 142 about a vehicle 144. Again, an exemplary system provides seven azimuthal antenna beams 146a–146g each of the antenna beams 146a–146g having a different maximum detection range 148 as indicated by shading. The maximum detection ranges 148 being different from beams 132a–132g (FIG. 8) so as to form a different actual maximum detection zone.

Figure 9:
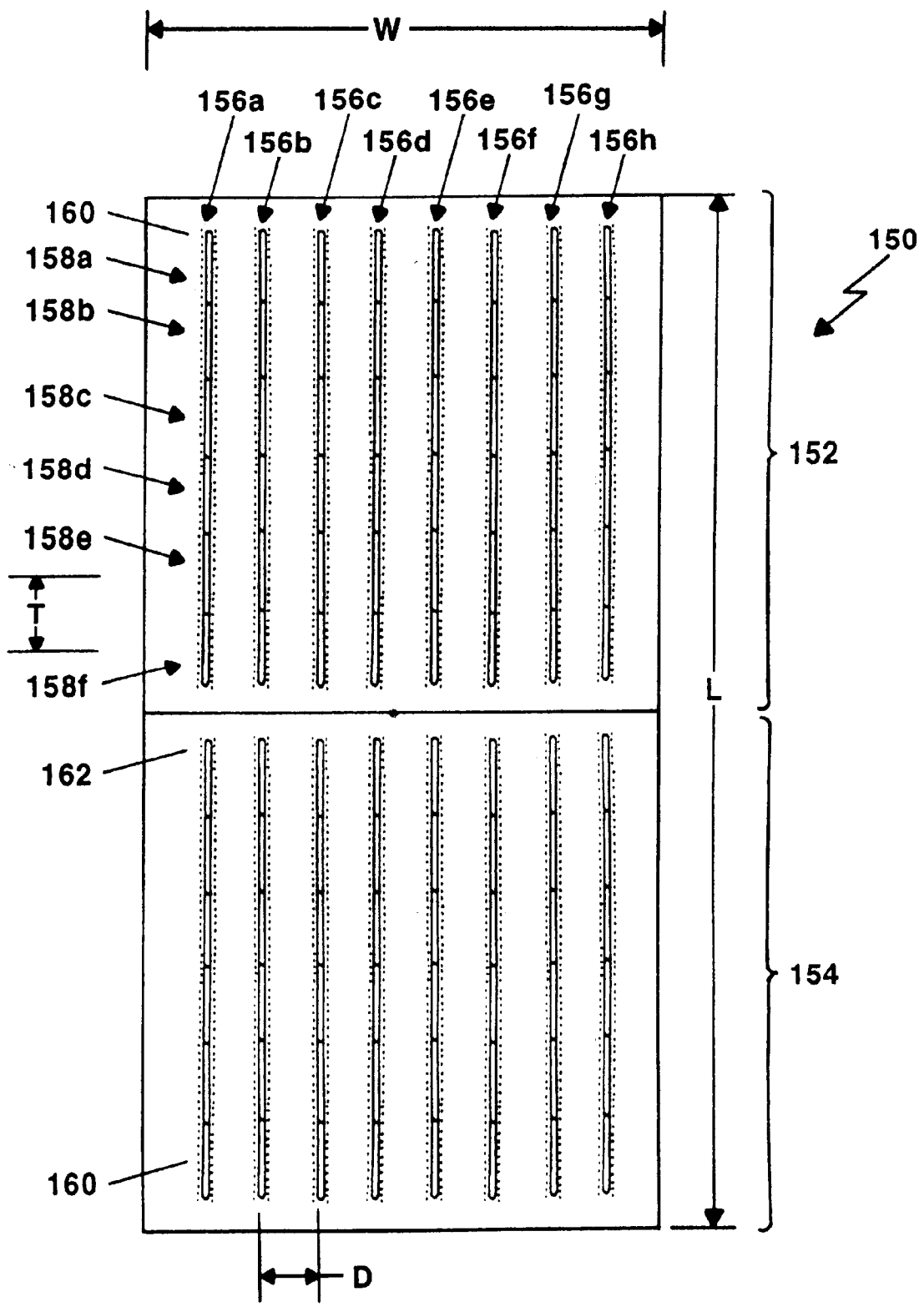
FIG. 9 is a top view of an array aperture formed by a plurality of antenna elements.

Referring now to FIG. 9, an array antenna 150 having a length L and width W includes a transmit array 152 and a receive array 154. Each of the arrays 152, 154 includes eight rows 156a–156g and six columns 158a–158f. Thus each of the transmit and receive arrays 152, 154 have forty-eight radiating elements (or more simply "radiators" or "elements"), generally denoted 160, with eight elements in azimuth and six elements in elevation.

As will be described in detail in conjunction with FIGS. 10 and 11, each radiating element 160 is a stripline-fed open-ended cavity in LTCC. The cavity is formed in the LTCC using embedded vias, generally denoted 162, that create the "cavity walls." Each of the arrays 152, 154 have a rectangular lattice spacing: 0.223" (azimuth)×0.295" (elevation). The azimuth spacing is driven by the Butler matrix to yield desired beam locations which provided desired detection zones. The elevation spacing is driven by an elevation beamwidth requirement and the maximum spacing needed to avoid a cover induced scan blindness.

In an automotive radar application, the antenna is enclosed in a plastic housing and will radiate through the housing cover (e.g. as shown in FIG. 3). In one embodiment, the housing cover can be incorporated into the radiator design. In a preferred embodiment, however, the antenna radiates through a housing cover spaced about one-half wavelength from the antenna aperture as shown in FIG. 3. In this approach, the antenna, can have an antenna cover disposed thereover, but the cover can be made of additional layer of LTCC (e.g. as represented by layer 176 in FIG. 10).

Figure 10:
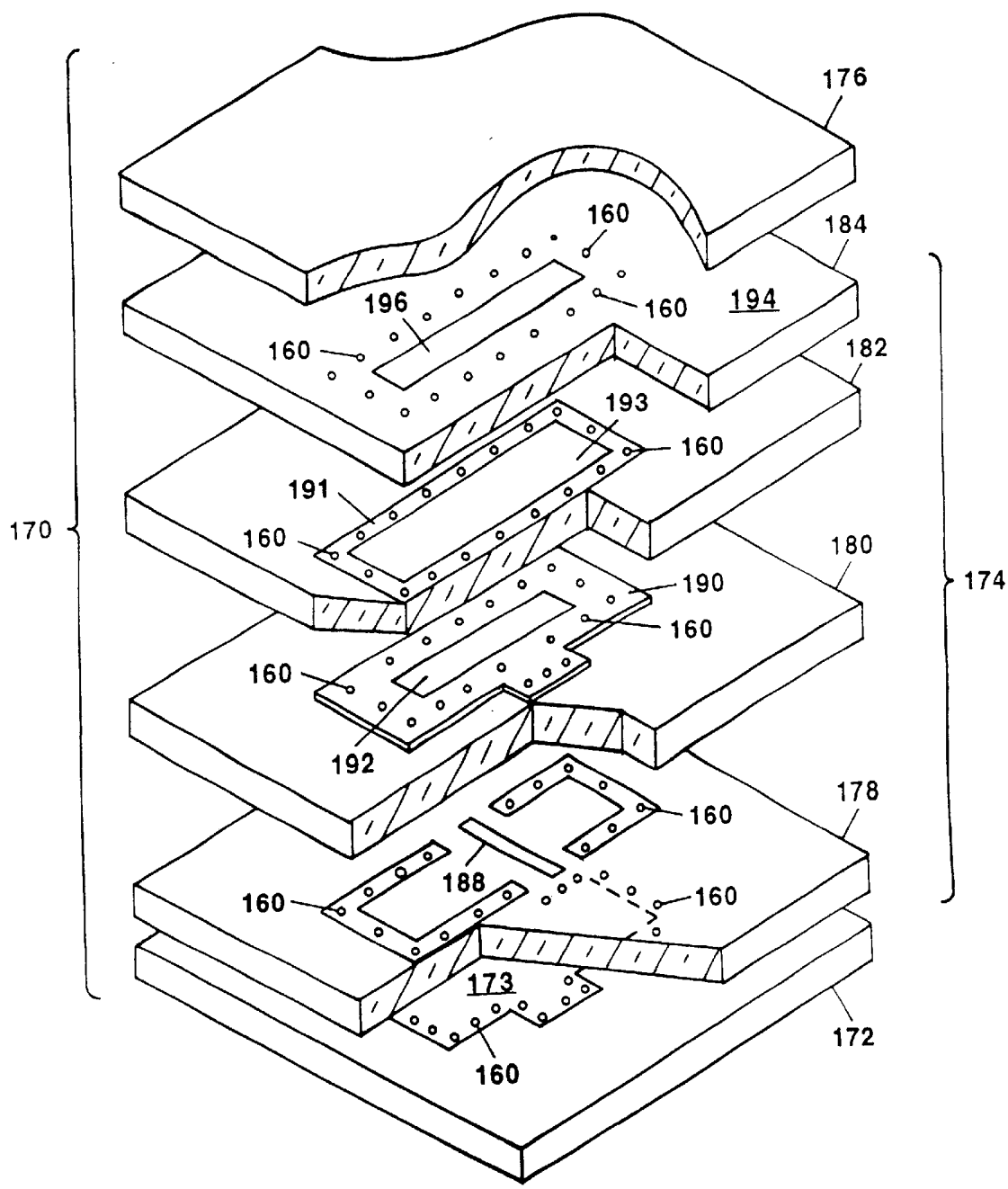
FIG. 10 is an exploded perspective view of an antenna element.

Referring now to FIG. 10, in which like elements of FIG. 9 are provided having like reference designations, a radiating element 170 which may be used for example in the antennas described in conjunction with FIGS. 2A, 3, 5, 8, 9 and 11 includes a ground plane layer 172 having first and second opposing surfaces with a ground plane 173 disposed over the second surface thereof. A plurality of radiating layers 174 are disposed over the second surface of the ground plane layer 172. Each of the radiating layers 174 has an antenna structure included thereon as will be described below in detail below. Suffice it here to say that structures on each of the radiating layers 174 are appropriately aligned relative to the ground plane 173.

An antenna element cover layer 176 is disposed over the radiating layers 174. In one embodiment, the element cover layer 176 for the antenna 170 is incorporated into the radiator 170. In one particular embodiment in which the element operates at a frequency of about 24 GHz, the element cover layer 176 is provided having a thickness of about 0.038 inches and a dielectric constant of about 3.5 and is used to "tune" the radiator 170 (i.e. the cover 176 is utilized to help provide the antenna element 170 having an appropriate response to signals in a desired frequency range.

In another embodiment, to be described below in conjunction with FIG. 10, the cover layer 176 is provided from LTCC having a thickness of about 22.2 mils. In this embodiment, the cover layer can be provided from three 10 mil (prefired) tape layers (e.g. layers 218–222 in FIG. 11).

In the embodiment of FIG. 9, the radiating layers are provided from four layers 178–184. Each of the radiating layers 178–184 are provided as LTCC tape layers. The layers are provided having a thickness of about 10 mil (prefired) and about 7.4 mil(post fired) with a nominal $\in_r$ of about 5.9. and a loss tangent typically of about 0.002.

Layer 178 is provided having a conductive strip 188 disposed thereon which corresponds to an antenna element feed circuit 188. The layer 180 is provided having a conductive material 190 disposed thereon which corresponds to a ground plane 190. Thus, feed circuit 188 is disposed between upper and lower ground planes and thus layer 178 corresponds to a stripline feed layer 178.

The ground plane 190 is provided having an aperture 192 therein and thus layer 180 corresponds to both a ground plane layer and a capacitive layer 180. Layer 182 is provided having a conductive trace 191 disposed thereon through which vias 160 are disposed. The conductive trace 191 forms an aperture 193. Disposed over the layer 182 is the layer 184 which is provided having a ground plane 194 disposed on a top or second surface thereof. The ground plane has a portion thereof removed to form an aperture 196.

Conductive vias 160 pass through each of the layers 172 and 178–184 to form a cavity. Thus, the ground plane layer 172, radiating layers 174 (and associated structures disposed on the radiating layers 174) and cover layer 176 form the radiating element 170 as a stripline-fed open-ended cavity formed in LTCC. The cavity is formed in the LTCC by the embedded vias 160 which provide a continuous conductive path from a first or top surface of aperture layer 184 to a second or top surface of the ground plane layer 172 and is fed by the stripline probe 188.

In one particular embodiment the cavity is provided having a length of 0.295 inches, a width of 0.050 inches and a height of 0.0296 inches (0.295"×0.050"×0.0296"). The capacitive windows 192 were used on the aperture and as internal circuit layers for tuning the radiator.

In this particular embodiment, the design of the radiator 170 was driven by the desire to reduce the number of LTCC layers, and here the cost. Due to the low cost requirement of the antenna, the antenna itself was specified to have a maximum number of eight LTCC tape layers. As described above in conjunction with FIG. 5, the Butler Matrix circuit is comprised of four LTCC tape layers or two stripline circuit layers. Due to the size and circuit layout of the Butler Matrix, it was necessary to split the beam forming network between two stripline circuit layers or four LTCC tape layers. Therefore, there were four LTCC tape layers available for the radiator. In addition, these remaining four LTCC circuit layers also needed to include the elevation distribution network. This resulted in an RF circuit having a relatively high density of circuits on those layers.

In this particular embodiment, the antenna element 170 includes the reactive apertures or windows 192, 193 and 196 which are used to provide the radiating element 170 having a desired impedance match to free space impedance. The reactive apertures 192, 193, 196 as well as the element cover 176 are used to match the impedance of the feed line 188 to free space impedance. Thus, the radiating element 170 includes tuning structures on a plurality of different layers, here three different layers of the radiator, which can be used to provide the antenna element 170 having a desired impedance.

The cover 176 was provided from LTTC and was utilized as a tuning structure as well. However, dielectric covers are often associated with scan blindness phenomena in arrays. An analysis of the scan reflection coefficient for different cover thicknesses was performed to ensure that scan blindness effects would not hinder the performance of the antenna.

The results of the scan blindness analysis for a variety of cover thicknesses for scan reflection coefficient (due to the cover 176) vs. the scan angle in degrees revealed that a preferred range of cover thicknesses is 0.0.020 inch to 0.030 inch. At these cover thicknesses, the scan reflection coefficient is relatively small in the azimuth scan at the farthest scan angle of 75°. Therefore, this range of covers should not produce any scan blindnesses in the array in the azimuth scan to 75°.

In one embodiment, a 0.022 inch thick cover, the closest multiple of 7.4 mils to the optimum thickness using analytic techniques was used in the design of the radiator. An elevation scan analysis indicated that there would be no scan blindness effects with any of the covers at an elevation beam steer of 15°.

Figure 11:
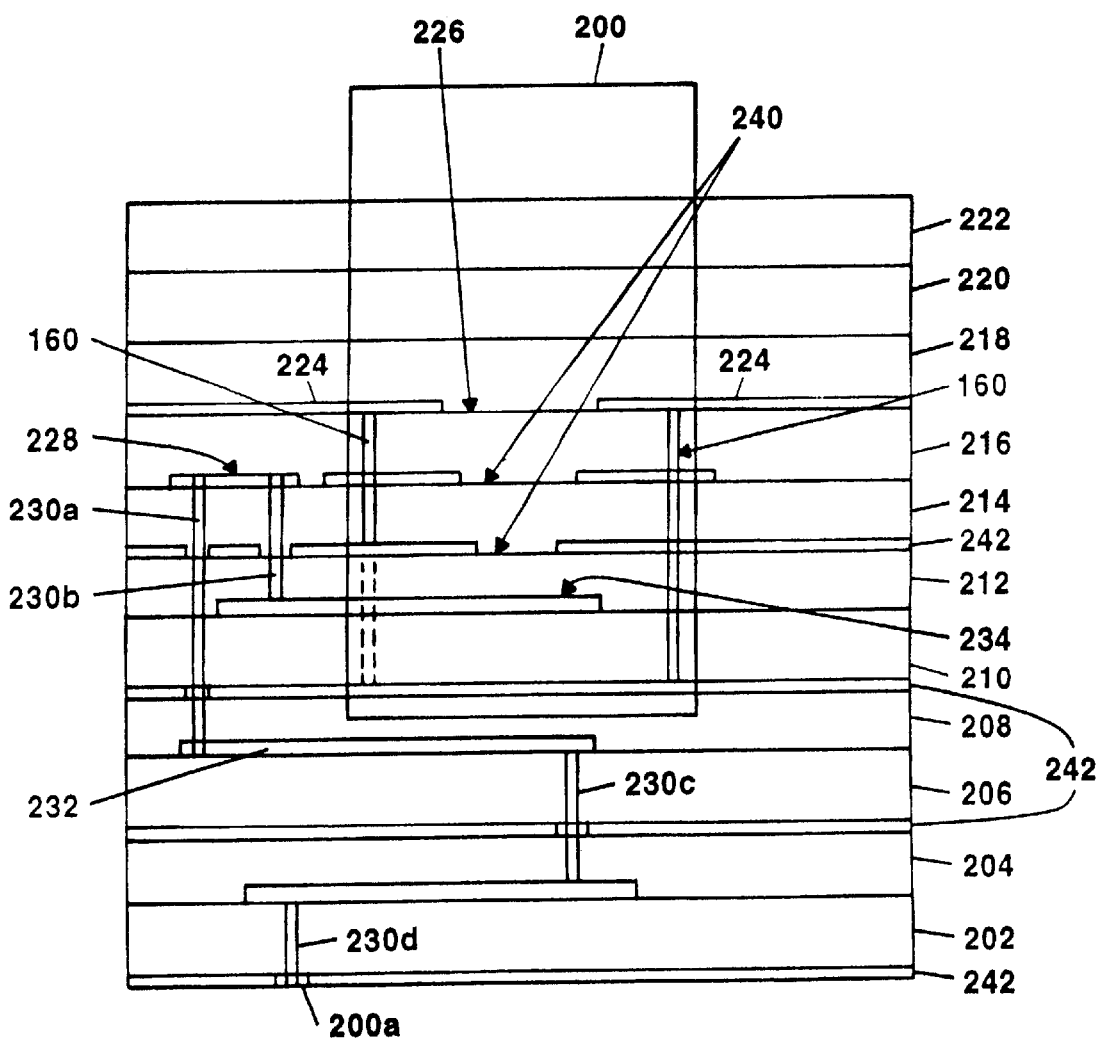
FIG. 11 is a cross-sectional view of taken across lines 11—11 of the antenna element of FIG. 10.

Referring now to FIG. 11 in which like elements of FIG. 10 are provided having like reference designations, a radiating element 200 and associated feed circuits are provided from eleven LTCC tape layers 202–222, each of the layers having a post-fired thickness typically of about 0.0074 inch and having a (stripline) ground plane spacing of 0.0148 inch. The element 200 has an element signal port 200a provided in layer 202.

The radiating element 200 is provided from the structures to be described below provided in the layers 210–222 as shown. It should be noted that cover layers 218–222 (which may correspond to cover layer 176 in FIG. 10) are integral to the radiating element 200. Layer 216 has a ground plane 224 disposed thereon. Portions of the ground plane are removed to form an aperture 226.

A power divider circuit 228 is coupled through conductive vias 230a, 230b to a conductive trace 232 and a strip line feed circuit 234, respectively. Thus, an elevation feed circuit is interlaced with the element 200.

Capacitive windows 240 are formed on layers 214, 216 via by disposing ground planes material on the layers 214, 216 and providing openings in the ground planes. Layers 202, 204 and 208 are also provided having ground planes 242 disposed thereon. Layers 202–208 are dedicated to a Butler Matrix circuit while layers 210–216 are dedicated to the radiator and feed circuit.

The embedded vias 160 in the LTCC are used for forming the waveguide structure of the radiator in the LTCC while vias 230a, 230b, 230c, 230d are used for transitioning between the circuits on the different layers 202–216. As can been seen in FIGS. 9 and 10, the embedded vias 160 form a waveguide structure and share the same layers as the power divider circuit 228 and the radiator feed circuit 234.

The LTCC manufacturing flow comprises eight operations which are defined as: tape blanking, via formation, via filling, conductor deposition, lamination, wafer firing, continuity test, and dicing. The following is a brief description of each of the eight operations.

Raw LTCC is supplied in tape form on spools having a standard width of either seven or ten inches. Typical tape area per roll ranges from 4200 to 6000 sq. in. and is also predetermined at time of order. The blanking of LTCC tape is performed manually with the use of an arbor blanking die. Tape is blanked to either a 5" or a 7" manufacturing format size. An orientation hole is also introduced during the blanking operation which references the LTCC tape's as-cast machine and transverse directions. This orientation hole will ultimately allow for layers to be identified and cross-plied in order to optimize total product shrinkage at firing.

The creation of Z-axis via holes is performed through the use of a high speed rapid punch system. The system is driven by punch CAD/CAM data which is electronically down loaded via ethernet directly to the manufacturing work cell. The supplied punch files contain X-Y-coordinate locations for via formation. Individual tape layers, in either a 5" or 7" format, are mounted into single layer tape holders/frames. These framed layers are subsequently loaded into a handling cassette which can house a maximum of 25 LTCC tape layers. The cassette is loaded and is handled automatically at the work center when respective punch programs are activated. The high speed punch processes vias holes in tape layers individually and ultimately indexes through the entire cassette. Via holes are formed at typical rates of 8 to 10 holes per second. At the completion of via formation for a particular tape layer the cassette is unloaded from the work center, processed tape layers removed, and the cassette is reloaded for continued processing.

LTCC tape layers which have completed respective via formation operations require the insertion of Z-axis conductors in order to ultimately establish electrical interface with upper and lower product layers. The via filling operation requires the use of positive pressure displacement techniques to force conductive pastes into via formed holes in the dielectric tape. Mirror image stencils are manufactured for respective tape layers which feature all punched via hole locations; these stencils are fixtured on a screen printing work cell. LTCC tape layers are soft fixtured onto a porous vacuum stone. The stone is indexed under the stencil where a preset pressure head travels over the stencil forcing deposited conductor paste through the stencil and into the dielectric tape. Each tape layer is processed in a similar fashion; all layers are dried, driving off solvents, prior to follow on operations.

Via filled dielectric tape layers require further processing to establish X- and Y-axis conductor paths. The deposition of these conductor mediums provides "from-to" paths on any one LTCC layer surface and originate from and terminate at filled via locations. The conductor deposition operation employs the same work center as described in the via filling operation with the exception that wire mesh, emulsion patterned screens are substituted for through hole stencils. The technique for fixturing both the screen and the tape product is also the same. All product layers are serially processed in this fashion until deposition is complete; again, all layers are dried prior to follow on operations.

Prior to lamination all previous tape processing operations occur in parallel with yield fallout limited to respective layer types. The lamination operation requires the collation and marriage of parallel processed layers into series of independent wafers. Individual layers, (layers 1, 2, 3, . . . n), are sequentially placed upon a lamination caul plate; registration is maintained through common tooling which resides in all product layers. The collated wafer stack is vacuum packaged and placed in an isostatic work cell which provides time, temperature, and pressure to yield a leathery wafer structure.

Laminated wafers are placed on firing setters and are loaded onto a belt furnace for product densification. Firing is performed in a single work cell which performs two independent tasks. The primary operation calls for the burning off of solvents and binders which had allowed the tape to remain pliable during the via formation, filling, conductor deposition, and lamination operations. This binder burnout occurs in the 350–450 C. range. The wafer continues to travel down the belt furnace and enters the peak firing zone where crystallization, and product densification occurs; temperatures ranging to 850–860 C. are typical. Upon cool down the wafers exit the furnace as a homogenous structure exhibiting as-fired conditions. All product firing occurs in an air environment. Post firing operations would not require wafers to be processed through an additional binder burnout steps but would only require exposure to the 850 C. densification temperatures.

Continuity net list testing is performed on individual circuits in wafer form. Net list data files are ethernet down loaded to the net probe work center and are exercised against respective wafer designs. Opens and shorts testing of embedded nets, and capacitance and resistive load material measurements defines the bulk work center output. Failures are root caused to specific net paths.

Net list tested wafers typically exhibit individual circuit step/repeat patterns which can range from one to fifty or more on any one particular wafer. Conventional diamond saw dicing techniques are employed to singulate and dice circuits out of the net list tested wafers. Common fixturing is in place to handle both 5" and 7" fired wafer formats.

Figure 12:
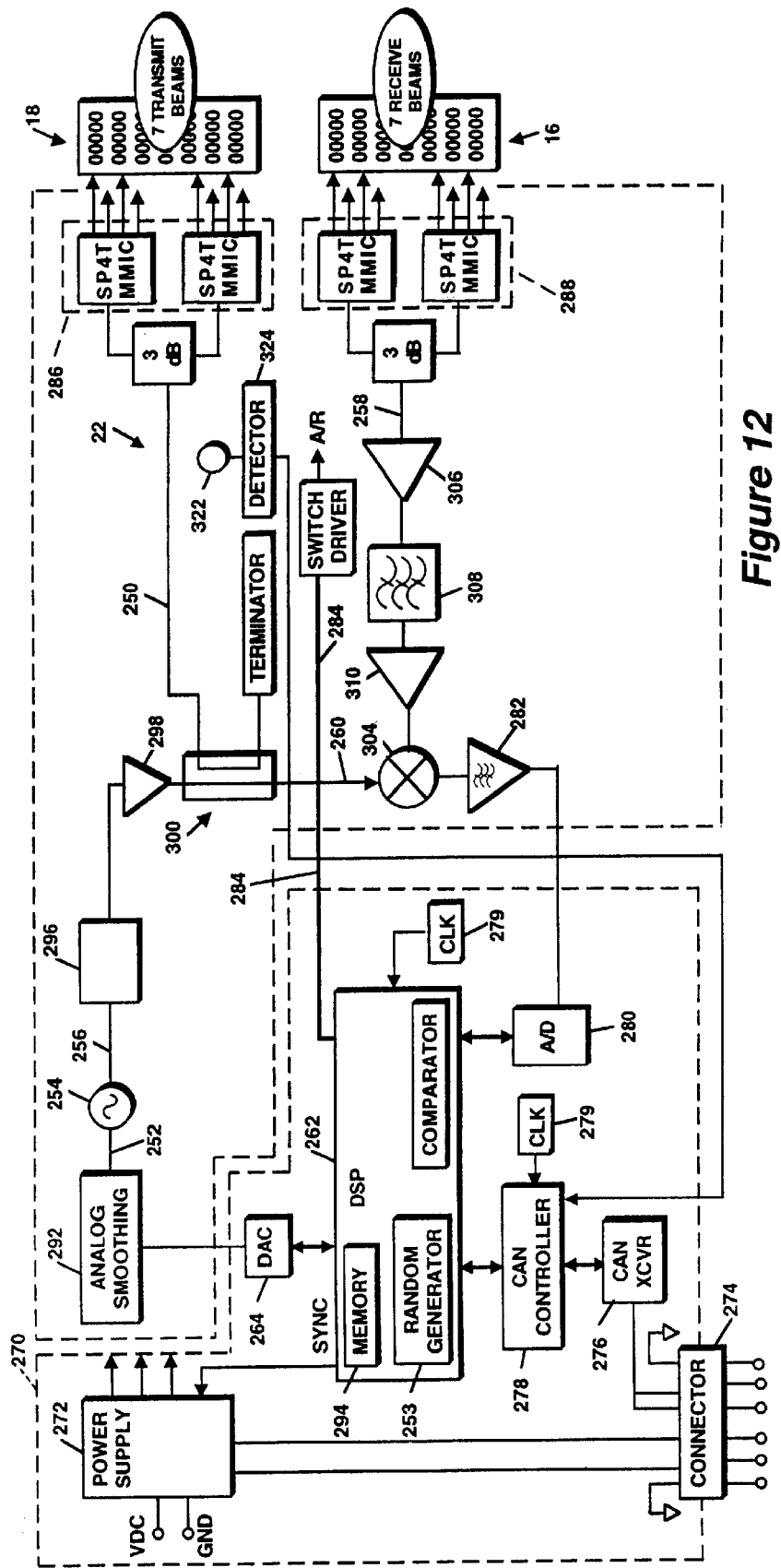
FIG. 12 is a detailed block diagram of a SOD system.

Referring now to FIG. 12, a radar system which may be similar to the radar systems described above in conjunction with FIGS. 1 and 2 respectively for use as a SOD system is shown in greater detail. In general overview of the operation of the transmitter 22 (FIG. 1), the FMCW radar transmits a signal 250 having a frequency which changes in a predetermined manner over time. The transmit signal 250 is generally provided by feeding a VCO control or ramp signal 252 to a voltage controlled oscillator (VCO) 254. In response to the ramp signal 252, the VCO 254 generates a chirp signal 256.

A measure of transmit time of the RF signal can be determined by comparing the frequency of a received or return signal 258 with the frequency of a sample 260 of the transmit signal. The range determination is thus provided by measuring the beat frequency between the frequencies of the sample 260 of the transmit signal and the return signal 258, with the beat frequency being equal to the slope of the ramp signal 252 multiplied by the time delay of the return signal 258.

The measured frequency further contains the Doppler frequency due to the relative velocity between the target and the radar system. In order to permit the two contributions to the measured frequency shift to be separated and identified, the time-varying frequency of the transmit signal 250 is achieved by providing the control signal 252 to the VCO 254 in the form of a linear ramp signal.

In one embodiment, the VCO control signal 252 is generated with digital circuitry and techniques. In a preferred embodiment, the ramp signal 252 is generated by a DSP 262 and a digital-to-analog converter (DAC) 264. Use of the DSP 262 and DAC 264 to generate the ramp signal 252 is possible in the SOD system of FIG. 12 since, it has been determined that by proper selection of the detection zone characteristics including but not limited to detection zone size, shape and resolution, precise linearity of the chirp signal 256 is not necessary. With this arrangement, the frequency of the transmit signal 250 is accurately and easily controllable which facilitates implementation of several advantageous and further inventive features. As one example, one or more characteristics of successive ramps in the ramp signal 252 are randomly varied (via random number generator 253, for example) in order to reduce interference between similar, proximate radar systems. As another example, temperature compensation is implemented by appropriately adjusting the ramp signal 252. Yet another example is compensation for non-linearity in the VCO operation. Further, changes to the SOD system which would otherwise require hardware changes or adjustments can be made easily, simply by downloading software to the DSP. For example, the frequency band of operation of the SOD system can be readily varied, as may be desirable when the SOD is used in different countries with different operating frequency requirements.

An electronics portion 270 of the SOD system includes the DSP 262, a power supply 272 and a connector 274 through which signal buses 42, 46 (FIG. 1) are coupled between the SOD system and the vehicle 40 (FIG. 1). The digital interface unit 36 (FIG. 1) is provided in the form of a controller area network (CAN) transceiver (XCVR) 276 which is coupled to the DSP via a CAN microcontroller 278. The CAN controller 278 has a system clock 279 coupled thereto to provide frequency stability. In one embodiment, the system clock is provided as a crystal controlled oscillator. An analog-to-digital (A/D) converter 280 receives the output of a video amplifier 282 and converts the signal to digital form for coupling to the DSP 30 for detection processing. In one embodiment, the A/D converter is provided as a twelve bit A/D converter. Those of ordinary skill in the art will appreciate, however, that any A/D converter having sufficient resolution for the particular application may be used. A signal bus 284 is coupled to antenna switch circuits 286, 288 in order to provide control signals to drive the switches which comprise the switch circuits. Circuits 286, 288 can include switches (e.g. switches 105, 106 of FIG. 5), phase lines (e.g. lines 103a–103h of FIG. 5) and a beamforming circuit (e.g. Butler matrix beamforming circuit 98 in FIG. 5). Also provided in the electronics portion 270 of the SOD system is a memory 190 in which software instructions, or code and data are stored. In the illustrative embodiment of FIG. 12, the memory 190 is provided as a flash memory 190.

The DSP provides output signals, or words to the DAC which converts the DSP output words into respective analog signals. An analog smoothing circuit 292 is coupled to the output of the DAC in order to smooth the stepped DAC output to provide the ramp control signal to the VCO. The DSP includes a memory device 294 in which is stored a look-up table containing a set of DSP output signals, or words in association with the frequency of the transmit signal generated by the respective DSP output signal.

The VCO 254 receives ramp signal 252 from the analog smoothing circuit. The VCO operates in the transmit frequency range of between 24.01 to 24.24 GHz and provides an output signal to bandpass filter 296, as shown.

The output of the VCO 254 is filtered by the bandpass filter 296 and amplified by an amplifier 298. A portion of the output signal from amplifier 298, is coupled via coupler 300 to provide the transmit signal 250 to the transmit antenna 18. Another portion of the output signal from the amplifier 298 corresponds to a local oscillator (LO) signal fed to an LO input port of a mixer 304 in the receive signal path.

The switch circuits 286, 288 are coupled to the receive and transmit antennas 16, 18 through a Butler matrix. The antennas 16, 18 and switch circuits 286, 288, and Butler matrix can be of the type described above in conjunction with FIGS. 1–11. Suffice it here to say that the switch circuits and Butler matrix operate to provide the antenna having a switched antenna beam with antenna beam characteristics which enhance the ability of the SOD system to detect targets.

The received signal 258 is processed by an RF low noise amplifier (LNA) 306, a bandpass filter 308, and another LNA 310, as shown. The output signal of the RF amplifier 310 is down-converted by mixer 304 which receives the local oscillator signal coupled from the transmitter, as shown. Illustrative frequencies for the RF signals from the amplifier 310 and the local oscillator signal are on the order of 24 GHz. Although the illustrated receiver is a direct conversion, homodyne receiver, other receiver topologies may be used in the SOD radar system.

A video amplifier 282 amplifies and filters the down-converted signals which, in the illustrative embodiment have a frequency between 1 KHz and 40 KHz. The video amplifier 64 may incorporate features, including temperature compensation, filtering of leakage signals, and sensitivity control based on frequency, as described in a co-pending U.S. Patent Application entitled Video Amplifier for a Radar Receiver, application Ser. No. 09/931,593, filed on Aug. 16, 2001, and incorporated herein by reference in its entirety.

The A/D converter 280 converts the analog output of the video amplifier 320 into digital signal samples for further processing. In particular, the digital signal samples are processed by a fast Fourier transform (FFT) within the DSP in order to determine the content of the return signal within various frequency ranges (i.e., frequency bins). The FFT outputs serve as data for the rest of the signal processor 262 in which one or more algorithms are implemented to detect objects within the field of view, as described in co-pending U.S. Patent Application entitled Radar Transmitter Circuitry and Techniques, application Ser. No. 09/931,636, filed on Aug. 16, 2001, and incorporated herein by reference in its entirety.

The radar system includes a temperature compensation feature with which temperature induced variations in the frequency of the transmit signal are compensated by adjusting the ramp signal accordingly. For this purpose, the transmitter 22 includes a DRO 322 coupled to a microwave signal detector 324. The output of the microwave detector is coupled to an analog-to-digital converter of the CAN controller for processing by the DSP. The details of such processing are described in the aforementioned U.S. patent application Ser. No. 09/931,636, entitled Radar Transmitter Circuitry and Techniques.

It should be appreciated that in a preferred embodiment, the receive and transmit antenna antennas 16, 18 of the sensor system are arranged as a bi-static antenna pair. In other embodiments, however, a monostatic arrangement can be used.

In one embodiment, the transmit signal path includes a signal source having an output coupled to an input port of a switch circuit having a plurality of output ports each of which is coupled through a Butler beam forming circuit to a column feed circuit of the transmit antenna. Thus, the number of output ports in the switch circuit corresponds to the number of columns included in the transmit antenna. In one embodiment, the switch circuit is provided from a coupler circuit having an input port and a pair of output ports and a pair of switch circuits, each of the switch circuits having a common port and a plurality of output ports. Each of the coupler output ports are coupled to a one of the switch common ports. Each of the switches has a number of outputs corresponding to a predetermined number of columns included in the transmit antenna. In a preferred embodiment, the number of total output ports between the two switches equals the number of columns in the antenna. Each of the switch outputs are thus coupled to inputs of the transmit antenna. With this arrangement, a combined beam transmit architecture is provided.

Similarly, on a receive signal path, the receive antenna is coupled to a receiver circuit through a Butler beam forming circuit and phase lines which lead from the receive antenna output ports to the input ports of a switch circuit. The switch circuit can be provided from a coupler and a pair switches as described above in conjunction with the transmit antenna. By selectively coupling predetermined ones of the switch circuit input ports to the switch output port, combined beams are provided. With this arrangement, a combined beam receive architecture is provided.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

All publications and references cited herein are expressly incorporated herein by reference in their entirety.

What is claimed is:

1. A switched beam antenna system comprising:
   a first plurality of antenna elements disposed to provide an antenna;
   a beamforming network that forms orthogonal beams at fixed locations having a plurality of antenna ports and a plurality of switch ports with each of the antenna ports coupled to ones of said first plurality of antenna elements; and a first switched beam combining circuit having an input port and a plurality of output ports, each of the output ports coupled to a corresponding one of the plurality of switch ports of said beamforming network, said first switched beam combining circuit operative to simultaneously provide a radio frequency signal path between at least two of the plurality of switch ports of said beamforming network and the input port of said first switched beam combining circuit.

2. The system of claim 1 wherein said antenna corresponds to a transmit antenna and the system further comprises:

a second plurality of antenna elements disposed to provide a receive antenna;

a second beamforming network that forms orthogonal beams at fixed locations having a plurality of antenna ports and a plurality of switch ports with each of the antenna ports coupled to ones of said second plurality of antenna elements; and a second switched beam combining circuit having a plurality of input ports and an output port, each of the plurality of input ports coupled to a corresponding one of the plurality of the switch ports of said second beamforming network.

3. The system of claim 2 further comprising a receiver coupled to an output of said second switched beam combining circuit.

4. The system of claim 1 wherein said antenna corresponds to a transmit antenna and the system further comprises a transmit signal source having an output coupled to an input of said first switched beam combining circuit.

5. The system of claim 1 wherein said antenna is provided as an array antenna having a first plurality of antenna columns and said first switched beam combining circuit comprises:

a plurality of switch circuits, each of the switch circuits having an input port and a plurality of output ports wherein a total number of switch output ports provided from the combination of said plurality of switch circuits equals the number of antenna columns provided in the array antenna;

a coupler circuit having an input port and a plurality of output ports equal to the number of input ports provided from the combination of said plurality of switch circuits with each of the output ports of said coupler circuit coupled to a corresponding one of the input ports of said plurality of switch circuits.

6. The system of claim 5 wherein the number of total output ports between said plurality of switches equals the number of columns in the array antenna.

7. The system of claim 6 further comprising a plurality of phase lines each of the phase lines disposed between one of the switch output ports and one of the plurality of switch ports of said beamforming network.

8. The system of claim 7 wherein each of said antenna elements comprises:

a ground plane layer having a first ground plane disposed thereover;

an array feed circuit layer having a plurality of feed circuits disposed thereon, said array feed circuit layer disposed over said ground plane layer;

a radiator layer having a second ground plane disposed thereon with the second ground plane having an aperture therein, said radiator layer disposed over said feed circuit layer; and a cover layer disposed over said radiator layer; and a plurality of via holes disposed between the first and second ground plane layers to provide a cavity in said radiator and feed circuit layers.

9. The system of claim 1 wherein said beamforming network is a Butler matrix beamforming circuit.

10. A switched beam antenna system comprising:

a feed circuit layer having a first ground plane disposed thereon;

a radiator layer having a second ground plane disposed thereon with the second ground plane having an aperture therein, said radiator layer disposed over said feed circuit layer; and a cover layer disposed over said radiator layer;

at least one conductive path coupling the first and second ground plane layers to provide a cavity in said radiator and feed circuit layers;

an antenna element feed disposed to couple energy between the feed circuit and said radiator layer;

a switched beam combining circuit having a common port and a plurality of switch ports; and a beamforming network that forms orthogonal beams at fixed locations, said beamforming network having a plurality of beam ports and a plurality of output ports with each of the plurality of beam ports coupled to one of the switch ports of said switched beam combining circuit and each of the plurality of beamforming network output ports coupled to said feed circuit layer and wherein said switched beam combining circuit is operative to simultaneously provide a radio frequency signal path between at least two of the plurality of beam ports of said beamforming network and the common port of said switched beam combining circuit.

11. The system of claim 10 wherein said radiator layer comprises a low temperature co-fired ceramic (LTCC) substrate.

12. The system of claim 10 wherein said beamforming network corresponds to a Butler matrix beamforming circuit.

13. The system of claim 12 wherein said Butler matrix comprises a plurality of quadrature hybrid circuits coupled to a plurality of fixed phase elements, for forming multiple beams.

14. The system of claim 13 wherein the plurality of fixed phase elements are provided from circuit lines having differential line lengths.

15. The system of claim 10 wherein said cover comprises a tuning structure for matching an impedance of the radiating element to a predetermined impedance.

16. The system of claim 10 wherein said radiator layer further comprises a tuning structure for matching an impedance of the radiating element to a predetermined impedance.

17. The system of claim 10 wherein said at least one conductive path comprises a plurality of via holes between the first and second ground plane layers.

18. The system of claim 10 wherein the antenna element feed comprises a power divider disposed between said feed circuit layer and said radiator layer.

* * * * *

UNITED STATES PATENT AND TRADEMARK OFFICE
CERTIFICATE OF CORRECTION

PATENT NO. : 6,642,908 B2
DATED : November 4, 2003
INVENTOR(S) : Joseph S. Pleva et al.

It is certified that error appears in the above-identified patent and that said Letters Patent is hereby corrected as shown below:

<u>Title page,</u>
Item [57], ABSTRACT,
Line 2, delete "from stripline-fed" and replace with -- from a stripline-fed --.

<u>Column 2,</u>
Line 57, delete "element are provided" and replace with -- elements are provided --.

<u>Column 3,</u>
Line 13, delete "of a Butler matrix beams" and replace with -- of the Butler matrix beans; --.
Line 27, delete "view of taken" and replace with -- view taken --.

<u>Column 4,</u>
Line 55, delete "single or multiple processors," and replace with -- single or multiple processor, --.

<u>Column 5,</u>
Line 29, delete "portions of vehicle" and replace with -- portions of the vehicle --.
Line 39, delete "applications assigned" and replace with -- applications are assigned --.
Line 40, delete "each incorporated" and replace with -- each are incorporated --.

<u>Column 6,</u>
Line 17, delete "havibg" and replace with -- having --.
Line 28, delete "oneparticular" and replace with -- one particular --.

<u>Column 7,</u>
Line 30, delete "FIG. 5)" and replace with -- FIG. 5 --.
Line 57, delete "112is" and replace with -- 112 is --.

<u>Column 10,</u>
Line 18, delete "made of additional" and replace with -- made of an additional --.

UNITED STATES PATENT AND TRADEMARK OFFICE
CERTIFICATE OF CORRECTION

PATENT NO. : 6,642,908 B2
DATED : November 4, 2003
INVENTOR(S) : Joseph S. Pleva et al.

It is certified that error appears in the above-identified patent and that said Letters Patent is hereby corrected as shown below:

<u>Column 12,</u>
Lines 18-19, delete "214, 216 via" and replace with -- 214, 216 vias --.

<u>Column 13,</u>
Line 52, delete "burnout steps" and replace with -- burnout step --.

<u>Column 16,</u>
Line 20, delete "transmit antenna antennas" and replace with -- transmit antennas --.

<u>Column 18,</u>
Lines 3-4, delete "said feed circuit" and replace with -- said array feed circuit --.

Signed and Sealed this

Ninth Day of May, 2006

JON W. DUDAS
*Director of the United States Patent and Trademark Office*